(12) United States Patent
Borrelli et al.

(10) Patent No.: US 10,116,035 B2
(45) Date of Patent: Oct. 30, 2018

(54) ELECTRICALLY CONDUCTIVE ARTICLES WITH DISCRETE METALLIC SILVER LAYERS AND METHODS FOR MAKING SAME

(71) Applicant: Corning Incorporated, Corning, NY (US)

(72) Inventors: Nicholas Francis Borrelli, Elmira, NY (US); Anthony Ng'oma, Horseheads, NY (US); Alranzo Boh Ruffin, Taipei (TW); Joseph Francis Schroeder, III, Corning, NY (US); Dean Michael Thelen, Addison, NY (US)

(73) Assignee: Corning Incorporated, Corning, NY (US)

( * ) Notice: Subject to any disclaimer, the term of this patent is extended or adjusted under 35 U.S.C. 154(b) by 300 days.

(21) Appl. No.: 15/139,550

(22) Filed: Apr. 27, 2016

(65) Prior Publication Data

US 2016/0322694 A1     Nov. 3, 2016

Related U.S. Application Data

(60) Provisional application No. 62/155,068, filed on Apr. 30, 2015.

(51) Int. Cl.
    *B32B 17/06*     (2006.01)
    *B32B 15/04*     (2006.01)
    (Continued)

(52) U.S. Cl.
    CPC ............. *H01Q 1/12* (2013.01); *C03C 21/002* (2013.01); *C03C 21/005* (2013.01);
    (Continued)

(58) Field of Classification Search
    USPC ........ 428/426, 432, 434, 357, 364, 401, 688
    See application file for complete search history.

(56) References Cited

U.S. PATENT DOCUMENTS

| | | | |
|---|---|---|---|
| 2,748,020 | A | 5/1956 | Parsons et al. |
| 5,097,270 | A | 3/1992 | Lindenmeier et al. |

(Continued)

FOREIGN PATENT DOCUMENTS

| | | |
|---|---|---|
| CA | 2133931 A1 | 5/1995 |
| CN | 2307095 Y | 2/1999 |

(Continued)

OTHER PUBLICATIONS

Borsella et al; "Silver cluster formation in ion-exchanged waveguides: processing technique and phenomenological model"; Journal of Non-Crystalline Solids 253 (1999); pp. 261-267.

(Continued)

*Primary Examiner* — Lauren R Colgan
(74) *Attorney, Agent, or Firm* — Russell Magaziner

(57) ABSTRACT

An electrically conductive article that includes a monolithic glass body having a first primary surface; and an electrically conducting element formed in the body. The element includes a discrete layer, or a plurality of discrete layers, of metallic silver. Each layer has a thickness T such that 0.1 µm≤T≤0.5 µm and an electrical resistivity of about 50 nΩ·m to about 2000 nΩ·m. In addition, the element is spaced apart from the first primary surface by a distance D, wherein 0.1 µm≤D≤20 µm. In some aspects, the electrically conducting element and/or the monolithic glass body are configured as an antenna assembly, an optical fiber or a flexible glass substrate.

8 Claims, 12 Drawing Sheets

(51) Int. Cl.
*H01Q 1/12* (2006.01)
*C03C 21/00* (2006.01)
*C03C 25/602* (2018.01)
*C03C 25/605* (2018.01)
*C03C 25/607* (2018.01)
*H01Q 1/50* (2006.01)

(52) U.S. Cl.
CPC .......... *C03C 21/007* (2013.01); *C03C 25/602* (2013.01); *C03C 25/605* (2013.01); *C03C 25/607* (2013.01); *H01Q 1/50* (2013.01)

(56) References Cited

U.S. PATENT DOCUMENTS

| | | | |
|---|---|---|---|
| 5,246,792 A | 9/1993 | Watanabe | |
| 5,317,324 A | 5/1994 | Naito et al. | |
| 5,442,367 A | 8/1995 | Naito et al. | |
| 5,550,546 A | 8/1996 | Noneman et al. | |
| 5,557,289 A | 9/1996 | Ohara | |
| 5,589,839 A | 12/1996 | Lindenmeier et al. | |
| 5,610,619 A | 3/1997 | Zafar | |
| 5,627,552 A | 5/1997 | Farrar et al. | |
| 5,631,638 A | 5/1997 | Kasper et al. | |
| 5,738,529 A | 4/1998 | Wedell et al. | |
| 5,768,217 A | 6/1998 | Sonoda et al. | |
| 5,790,079 A | 8/1998 | Zafar | |
| 5,792,298 A | 8/1998 | Sauer et al. | |
| 5,821,904 A | 10/1998 | Kakizawa et al. | |
| 5,867,128 A | 2/1999 | Sauer | |
| 5,926,141 A | 7/1999 | Lindenmeier et al. | |
| 5,936,493 A | 8/1999 | Hulderman et al. | |
| 6,025,806 A | 2/2000 | Deininger et al. | |
| 6,211,814 B1 | 4/2001 | Benjamin et al. | |
| 6,229,493 B1 | 5/2001 | Iijima | |
| 6,236,372 B1 | 5/2001 | Lindenmeier et al. | |
| 6,275,157 B1 | 8/2001 | Mays et al. | |
| 6,307,515 B1 | 10/2001 | Sauer et al. | |
| 6,307,516 B1 | 10/2001 | Zafar et al. | |
| 6,313,796 B1 | 11/2001 | Potin et al. | |
| 6,369,768 B1 | 4/2002 | Fusinski | |
| 6,400,334 B1 | 6/2002 | Lindenmeier et al. | |
| 6,411,259 B1 | 6/2002 | Wendt et al. | |
| 6,452,557 B1 | 9/2002 | Twort | |
| 6,515,631 B1 | 2/2003 | Nakamura et al. | |
| 6,593,889 B1 | 7/2003 | Raddant | |
| 6,595,421 B2 | 7/2003 | Detwiler | |
| 6,608,597 B1 | 8/2003 | Hadzoglou et al. | |
| 6,652,711 B2 | 11/2003 | Brcka et al. | |
| 6,830,221 B1 | 12/2004 | Janson et al. | |
| 6,919,849 B2 | 7/2005 | Yang | |
| 6,937,198 B2 | 8/2005 | Iijima et al. | |
| 7,010,070 B2 | 3/2006 | Li et al. | |
| 7,071,886 B2 | 7/2006 | Doi et al. | |
| 7,106,263 B2 | 9/2006 | Kuehne | |
| 7,119,751 B2 | 10/2006 | Li et al. | |
| 7,123,202 B2 | 10/2006 | Maeuser et al. | |
| 7,126,539 B2 | 10/2006 | Li et al. | |
| 7,126,549 B2 | 10/2006 | Li et al. | |
| 7,157,023 B2 | 1/2007 | Mears | |
| 7,224,319 B2 | 5/2007 | Kubba et al. | |
| 7,333,059 B2 | 2/2008 | Li et al. | |
| 7,342,547 B2 | 3/2008 | Maniwa et al. | |
| 7,348,927 B2 | 3/2008 | Mondadori et al. | |
| 7,365,685 B2 | 4/2008 | Takeuchi et al. | |
| 7,400,152 B2 | 7/2008 | Thole et al. | |
| 7,498,993 B1 | 3/2009 | Lee et al. | |
| 7,505,002 B2 | 3/2009 | Surittikul et al. | |
| 7,515,802 B2 * | 4/2009 | Peuchert ............ C03B 37/01211 385/127 | |
| 7,545,333 B2 | 6/2009 | Li et al. | |
| 7,551,091 B2 | 6/2009 | Bergman et al. | |
| 7,564,416 B2 | 7/2009 | Lindenmeier et al. | |
| 7,586,451 B2 | 9/2009 | Lee et al. | |
| 7,586,452 B2 | 9/2009 | Li et al. | |
| 7,616,162 B2 | 11/2009 | Hoffmeister | |
| 7,719,475 B2 | 5/2010 | Kuehne | |
| 7,742,005 B2 | 6/2010 | Villarroel et al. | |
| 7,742,006 B2 | 6/2010 | Villarroel et al. | |
| 7,834,815 B2 | 11/2010 | Li et al. | |
| 8,009,107 B2 | 8/2011 | Li et al. | |
| 8,026,858 B2 | 9/2011 | Takaba et al. | |
| 8,094,088 B2 | 1/2012 | Shinkawa et al. | |
| 8,158,543 B2 | 4/2012 | Dejneka et al. | |
| 8,181,483 B2 | 5/2012 | Davis et al. | |
| 8,326,586 B2 | 12/2012 | Noh et al. | |
| 8,350,766 B2 | 1/2013 | Hisaeda | |
| 8,427,381 B2 | 4/2013 | Labrot et al. | |
| 8,441,402 B2 | 5/2013 | Gawronski et al. | |
| 8,457,232 B2 | 6/2013 | vanZelst et al. | |
| 8,577,289 B2 | 11/2013 | Schlub et al. | |
| 8,586,492 B2 | 11/2013 | Barefoot et al. | |
| 8,634,764 B2 | 1/2014 | Cruz et al. | |
| 8,750,944 B2 | 6/2014 | Rousu et al. | |
| 8,754,819 B2 | 6/2014 | Li et al. | |
| 8,765,262 B2 | 7/2014 | Gross | |
| 8,802,581 B2 | 8/2014 | Dejneka et al. | |
| 8,808,581 B2 | 8/2014 | Vernooy et al. | |
| 8,837,614 B2 | 9/2014 | Li et al. | |
| 8,951,927 B2 | 2/2015 | Dejneka et al. | |
| 9,268,420 B2 | 2/2016 | Liu et al. | |
| 2003/0098791 A1 | 5/2003 | Carlson et al. | |
| 2004/0107910 A1 | 6/2004 | Nakata et al. | |
| 2004/0173508 A1 | 9/2004 | Deursen et al. | |
| 2004/0194890 A1 | 10/2004 | Moroz | |
| 2004/0220038 A1 * | 11/2004 | Wolff .................. C03C 3/062 501/64 | |
| 2004/0263405 A1 | 12/2004 | Kogure et al. | |
| 2005/0174290 A1 | 8/2005 | Huang | |
| 2005/0265678 A1 * | 12/2005 | Manyam ............ G02B 6/02033 385/127 | |
| 2007/0045264 A1 | 3/2007 | Nekoda et al. | |
| 2007/0279301 A1 | 12/2007 | Hoffmeister et al. | |
| 2008/0246673 A1 | 10/2008 | Kagaya et al. | |
| 2008/0279515 A1 * | 11/2008 | Bickham ............ G02B 6/02333 385/123 | |
| 2009/0020761 A1 | 1/2009 | Okazaki | |
| 2009/0067792 A1 * | 3/2009 | Curdt .................. C03C 13/046 385/115 | |
| 2009/0098350 A1 | 4/2009 | Mears | |
| 2009/0142568 A1 | 6/2009 | Dejneka et al. | |
| 2010/0009154 A1 | 1/2010 | Allan et al. | |
| 2010/0028607 A1 | 2/2010 | Lee et al. | |
| 2010/0035038 A1 | 2/2010 | Barefoot et al. | |
| 2010/0291353 A1 | 11/2010 | Dejneka et al. | |
| 2011/0032164 A1 | 2/2011 | Villarroel et al. | |
| 2012/0019425 A1 | 1/2012 | Lee et al. | |
| 2012/0031560 A1 | 2/2012 | Koshimizu | |
| 2012/0034435 A1 | 2/2012 | Borrelli et al. | |
| 2012/0038527 A1 | 2/2012 | Tanaka | |
| 2012/0139801 A1 | 6/2012 | Oshima et al. | |
| 2012/0280380 A1 | 11/2012 | Kamgaing | |
| 2013/0004758 A1 | 1/2013 | Dejneka et al. | |
| 2013/0015053 A1 | 1/2013 | Benveniste et al. | |
| 2014/0106172 A1 | 4/2014 | Dejneka et al. | |
| 2014/0178663 A1 | 6/2014 | Varshneya et al. | |
| 2014/0266976 A1 | 9/2014 | Lee et al. | |
| 2014/0267990 A1 | 9/2014 | Moon et al. | |
| 2014/0356604 A1 * | 12/2014 | Borrelli .................. C03C 21/005 428/216 | |
| 2015/0162642 A1 | 6/2015 | Tsujimura et al. | |
| 2015/0210588 A1 | 7/2015 | Chang et al. | |

FOREIGN PATENT DOCUMENTS

| | | | |
|---|---|---|---|
| CN | 2394334 Y | 8/2000 | |
| CN | 2494287 Y | 6/2002 | |
| CN | 2689480 Y | 3/2005 | |
| CN | 2689481 Y | 3/2005 | |
| CN | 2726074 Y | 9/2005 | |
| CN | 2735558 Y | 10/2005 | |
| CN | 1266972 C | 7/2006 | |
| CN | 2847561 Y | 12/2006 | |
| CN | 200976391 Y | 11/2007 | |

(56) References Cited

FOREIGN PATENT DOCUMENTS

| | | | |
|---|---|---|---|
| CN | 201174421 Y | 12/2008 |
| CN | 201247810 Y | 5/2009 |
| CN | 201247811 Y | 5/2009 |
| CN | 201655957 U | 11/2010 |
| CN | 201725869 U | 1/2011 |
| CN | 102064378 A | 5/2011 |
| CN | 101242671 B | 6/2011 |
| CN | 201994408 U | 9/2011 |
| CN | 202103158 U | 1/2012 |
| CN | 102395225 A | 3/2012 |
| CN | 101345333 B | 5/2012 |
| CN | 202259685 U | 5/2012 |
| CN | 102503176 A | 6/2012 |
| CN | 202396003 U | 8/2012 |
| CN | 101345334 B | 9/2012 |
| CN | 102721333 A | 10/2012 |
| CN | 102856628 A | 1/2013 |
| CN | 202721268 U | 2/2013 |
| CN | 101820098 B | 3/2013 |
| CN | 102971907 A | 3/2013 |
| CN | 202817197 U | 3/2013 |
| CN | 101814650 B | 4/2013 |
| CN | 202969749 U | 6/2013 |
| CN | 202977721 U | 6/2013 |
| CN | 203165931 U | 8/2013 |
| CN | 103412227 A | 11/2013 |
| CN | 103647144 A | 3/2014 |
| CN | 203499299 U | 3/2014 |
| CN | 203499318 U | 3/2014 |
| CN | 203574091 U | 4/2014 |
| CN | 103872465 A | 6/2014 |
| CN | 103917049 A | 7/2014 |
| CN | 203883122 U | 10/2014 |
| DE | 102006060516 A1 | 6/2008 |
| DE | 102007028755 A1 | 12/2008 |
| EP | 325510 B1 | 4/1995 |
| EP | 1589606 A1 | 10/2005 |
| EP | 2597726 A1 | 5/2013 |
| EP | 2672565 A1 | 12/2013 |
| JP | 1093004 A | 4/1989 |
| JP | 7221525 A | 8/1995 |
| JP | 7315875 A | 12/1995 |
| JP | 7315876 A | 12/1995 |
| JP | 7315877 A | 12/1995 |
| JP | 9232846 A | 9/1997 |
| JP | 10276026 A | 10/1998 |
| JP | 11150416 A | 6/1999 |
| JP | 2000101324 A | 4/2000 |
| JP | 2001345620 A | 12/2001 |
| JP | 2002081975 A | 3/2002 |
| JP | 03385119 B2 | 3/2003 |
| JP | 2003124719 A | 4/2003 |
| JP | 03761013 B2 | 3/2006 |
| JP | 03761014 B2 | 3/2006 |
| JP | 2006079581 A | 3/2006 |
| JP | 2006121291 A | 5/2006 |
| JP | 2006222540 A | 8/2006 |
| JP | 2006251909 A | 9/2006 |
| JP | 2007269554 A | 10/2007 |
| JP | 2008172626 A | 7/2008 |
| JP | 2009004989 A | 1/2009 |
| JP | 04340072 B2 | 10/2009 |
| JP | 2010158035 A | 7/2010 |
| JP | 2011077792 A | 4/2011 |
| JP | 2011097187 A | 5/2011 |
| JP | 04831367 B2 | 12/2011 |
| JP | 05518371 B2 | 6/2014 |
| KR | 221270 B1 | 9/1999 |
| KR | 2006019325 A | 3/2006 |
| KR | 2006034754 A | 4/2006 |
| KR | 2007054452 A | 5/2007 |
| KR | 864452 B1 | 10/2008 |
| KR | 2010024602 A | 3/2010 |
| KR | 1036490 B1 | 5/2011 |
| KR | 1051537 B1 | 7/2011 |
| KR | 2011075512 A | 7/2011 |
| KR | 2012068102 A | 6/2012 |
| KR | 2012070355 A | 6/2012 |
| KR | 1273760 B1 | 6/2013 |
| KR | 2013078920 A | 7/2013 |
| KR | 1294158 B1 | 8/2013 |
| KR | 1360506 B1 | 2/2014 |
| TW | 490880 B | 6/2002 |
| TW | I241051 B | 10/2005 |
| TW | 201334285 A | 8/2013 |
| WO | 2011099423 A1 | 8/2011 |
| WO | 2013038784 A1 | 3/2013 |
| WO | WO2013063207 * | 5/2013 |
| WO | 2014136650 A1 | 9/2014 |

OTHER PUBLICATIONS

European Patent Office; Invitation to Pay Additional Fees for International Application No. PCT/US2016/028535; Mail dated Aug. 3, 2016; pp. 1-8.

Latif et al.; "Gain and efficiency enhancement of compact and miniaturised microstrip antennas using multi-layered laminated conductors"; IET Microw. Antennas Propag., 2011, vol. 5, Iss, 4; pp. 402-411.

* cited by examiner

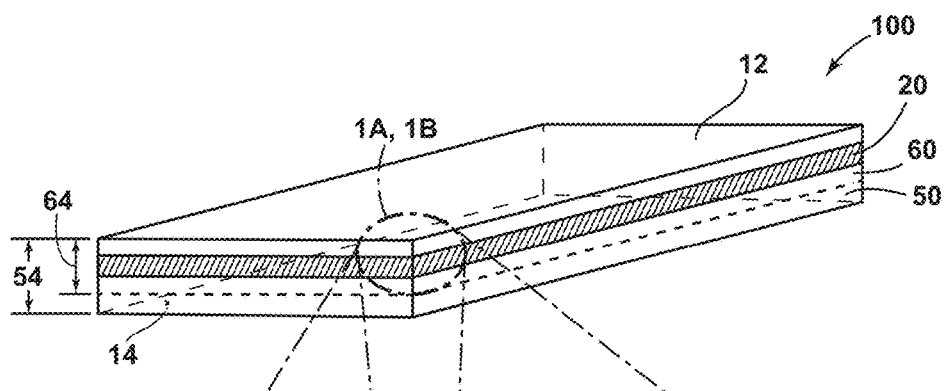
FIG. 1
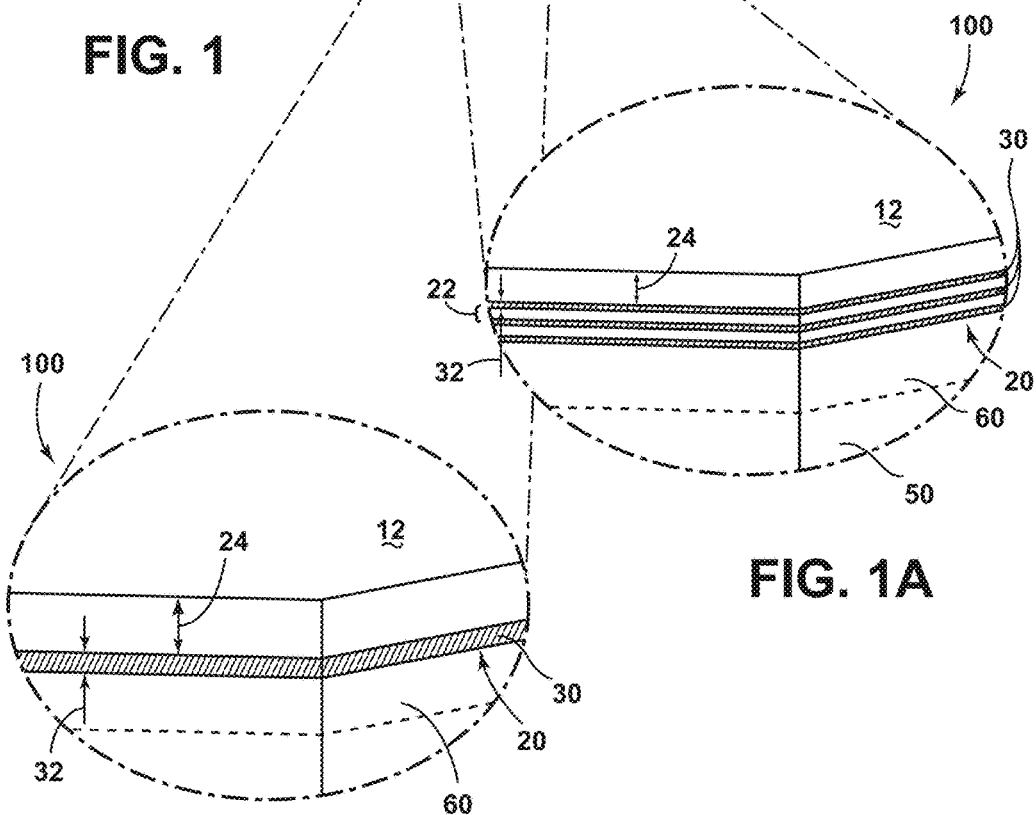
FIG. 1A
FIG. 1B

ELECTRICALLY CONDUCTIVE ARTICLES WITH DISCRETE METALLIC SILVER LAYERS AND METHODS FOR MAKING SAME

This application claims the benefit of priority under 35 U.S.C. § 119 of U.S. Provisional Application Ser. No. 62/155,068, filed on Apr. 30, 2015, the content of which is relied upon and incorporated herein by reference in its entirety.

FIELD

The present specification generally relates to electrically conductive glass articles and methods for making the same.

BACKGROUND

Various applications employ glass articles with conductors, including display devices and other electronic devices. These articles often employ metal conductors on one or more of their exterior surfaces. While the approaches used to process such conductors are relatively low in cost (e.g., electroplating), metal conductors on the exterior surfaces of glass articles are prone to environmental degradation. For certain application environments, these articles must also include other design features (e.g., polymeric sealants) to protect the conductors resulting in higher packaging costs and/or potential losses in temperature resistance.

In certain applications, the use of metallic conductors on an exterior surface of a glass article can reduce its aesthetic appeal. For example, a glass article employing a metal conductor on a visible portion of one of its exterior surfaces (e.g., a display device application) may experience a loss in aesthetics associated. The region of the exterior surface containing the metal conductor may exhibit visible height discontinuities associated with the conductor thickness.

Other applications employing glass articles with conductors address the foregoing environmental degradation and aesthetic concerns by situating their conductors inside the glass portion of the article. These glass articles are often made by sandwiching metal conductor films or traces between two or more glass substrates. The glass substrates are then sealed through various means around the conductors (e.g., other than in regions requiring electrical connections to the conductors). Nevertheless, these processes can be expensive, particularly in view of the criticality of the sealing step. In addition, the processes used to sandwich one or more conductors between the glass substrates can introduce defects into the substrates that result in a loss in strength for the glass article. In addition, the fixturing and process steps to seal the conductors within the substrates can limit the available shapes of the substrates to those that can be readily bonded through conventional processing including high temperature pressing and/or sintering steps (e.g., to flat rectangular sheets).

Accordingly, a need exists for electrically conductive glass articles with one or more of the following attributes: aesthetic appeal, low manufacturing costs, high environmental resistance and flexibility in terms of manufacturing and design aspects.

SUMMARY

According to an embodiment, an electrically conductive article includes a monolithic glass body having a first primary surface; and an electrically conducting element formed in the body. The element includes a discrete layer, or a plurality of discrete layers, of metallic silver. Each layer has a thickness T such that $0.1\ \mu m \leq T \leq 0.5\ \mu m$ and an electrical resistivity of about 50 nΩ·m to about 2000 nΩ·m. In addition, the element is spaced apart from the first primary surface by a distance D, wherein $0.1\ \mu m \leq D \leq 20\ \mu m$.

According to another embodiment, an electrically conductive article includes a monolithic glass body having a first primary surface; an electrically conducting element formed in the body; and an antenna assembly that includes the electrically conducting element and the monolithic glass body. The element includes a discrete layer, or a plurality of discrete layers, of metallic silver. Each layer has a thickness T such that $0.1\ \mu m \leq T \leq 0.5\ \mu m$ and an electrical resistivity ($\rho$) of about 50 nΩ·m to about 2000 nΩ·m. Further, the element is spaced apart from the first primary surface by a distance D, wherein $0.1\ \mu m \leq D \leq 20\ \mu m$. In an embodiment, the antenna assembly is configured to maximize antenna performance at 60 Hz or greater. In a preferred aspect, the antenna assembly and its respective electrically conductive element is configured such that $N/\rho^{1/2}$ is about $0.14\ (n\Omega \cdot m)^{-1/2}$ or greater when the assembly is operating at 60 GHz or greater, in which $\rho$ denotes the electrical resistivity of each discrete layer of metallic silver (nΩ·m) and N denotes the number of discrete layers of metallic silver in the electrically conducting element of the antenna assembly ($N \geq 1$).

According to an additional embodiment, an electrically conductive article includes a monolithic glass body having a first primary surface; and an electrically conducting element formed in the body. The monolithic glass body is configured as a fiber having a diameter between about 50 μm and about 600 μm. The element includes a discrete layer, or a plurality of discrete layers, of metallic silver. Each layer has a thickness T such that $0.1\ \mu m \leq T \leq 0.5\ \mu m$ and an electrical resistivity of about 50 nΩ·m to about 2000 nΩ·m. In addition, the element is spaced apart from the first primary surface by a distance D, wherein $0.1\ \mu m \leq D \leq 20\ \mu m$.

According to a further embodiment, an electrically conductive article includes a monolithic glass body having a first primary surface; and an electrically conducting element formed in the body. The monolithic glass body is configured as a flexible substrate having the first primary surface, a second primary surface, and a thickness between about 25 μm and about 200 μm. The element includes a discrete layer, or a plurality of discrete layers, of metallic silver. Each layer has a thickness T such that $0.1\ \mu m \leq T \leq 0.5\ \mu m$ and an electrical resistivity of about 50 nΩ·m to about 2000 nΩ·m. In addition, the element is spaced apart from the first primary surface by a distance D, wherein $0.1\ \mu m \leq D \leq 20\ \mu m$.

In another embodiment, a method for forming an electrically conductive article may include the following steps: providing an ion-exchangeable glass body having a first primary surface; and exchanging sodium ions in the glass body for silver ions; and forming the silver ions in the glass body into an electrically conducting element within the body. The electrically conducting element includes a discrete layer, or a plurality of discrete layers, of metallic silver. Each layer has a thickness T such that $0.1\ \mu m \leq T \leq 0.5\ \mu m$ and an electrical resistivity of about 50 nΩ·m to about 2000 nΩ·m. In addition, the element is spaced apart from the first primary surface by a distance D, wherein $0.1\ \mu m \leq D \leq 20\ \mu m$.

In certain aspects of the foregoing method, the sodium ions in the glass body are exchanged for silver ions by positioning the glass body in a salt bath comprising from about 0.05 wt. % to about 5 wt. % $AgNO_3$ and from about 95 wt. % to about 99.95 wt. % of $MNO_3$, wherein M is an alkali metal ion and the salt bath has a bath temperature from about 300° C. to about 500° C. to facilitate diffusion of $Ag^{+1}$ ions into the glass body. In some implementations, the silver ions in the glass body are formed into the electrically conducting element by: positioning the glass body in flowing hydrogen gas; and heating the glass body in the flowing hydrogen gas to a reducing temperature of about 250° C. to about 500° C. for a treatment period Q to form the electrically conducting element in the body, wherein 5 minutes ≤Q≤50 hours.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 schematically depicts a perspective view of an electrically conductive article according to embodiments of the disclosure;

FIG. 1A is an enlarged perspective view of the electrically conductive article depicted in FIG. 1 having a plurality of discrete layers of metallic silver;

FIG. 1B is an enlarged perspective view of the electrically conductive article depicted in FIG. 1 having a discrete layer of metallic silver;

DETAILED DESCRIPTION

Figure 1C:
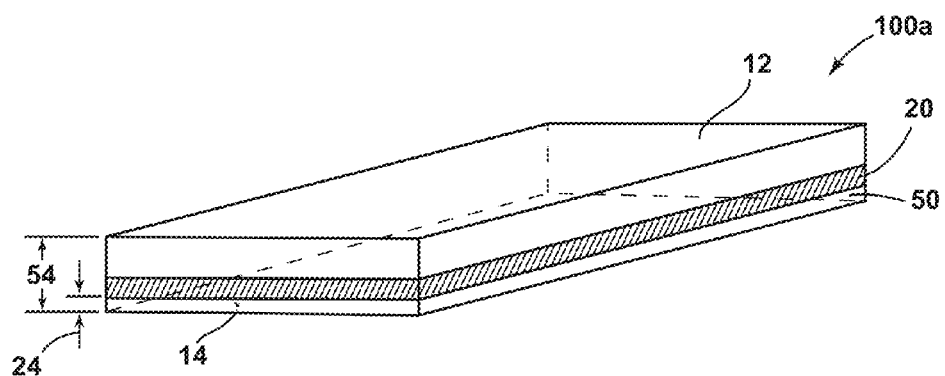
FIG. 1C schematically depicts a perspective view of an electrically conductive article with an electrically conducting element spaced apart from a second primary surface according to an embodiment of the disclosure.

Reference will now be made in detail to embodiments of the electrically conductive glass articles, examples of which are depicted in the attached drawings. Methods for forming the glass articles will also be described. Whenever possible, the same reference numerals will be used throughout the drawings to refer to the same or like parts. One embodiment of an electrically conductive glass article with one or more discrete layers of metallic silver is schematically depicted in FIG. 1. The glass article generally comprises a first surface, a second surface, and a monolithic body extending between the first surface and the second surface. An electrically conducting element comprising one or more discrete layers of metallic silver is formed in the body. Each discrete layer of metallic silver generally has a thickness T such that 0.1 µm≤T≤0.5 µm and an electrical resistivity of about 50 nΩ·m to about 2000 nΩ·m. Each discrete layer of metallic silver is generally spaced apart the first primary surface by a distance D, wherein 0.1 µm≤D≤20 µm. For aspects with a plurality of discrete layers of metallic silver, each layer of metallic silver is spaced apart from an adjacent layer by a spacing S such that S≤500 nm. The glass articles and methods for forming the glass articles will be described in more detail herein with specific reference to the appended drawings.

Referring to FIG. 1, an embodiment of an electrically conductive article 100 is schematically depicted. The article 100 generally comprises a first surface 12, a second surface 14 and a monolithic body 50 which extends from the first surface 12 to the second surface 14. The monolithic body 50 and article 100 are further defined by a thickness 54. In addition, the monolithic glass body 50 is continuous with the first surface 12 and the second surface 14 such as when the body is formed from a single piece of glass. The monolithic body 50 of the article 100 may have a variety of different forms. For example, in some embodiments, the first surface 12 and the second surface 14 may be parallel with one another such as when electrically conductive article 100 is a component in a display device. Alternatively, the electrically conductive article 100 may have some degree of curvature along its length and/or width dimensions, such as when the article is a display device component in a curved mobile phone. In some implementations of the article 100 depicted in FIG. 1, the monolithic glass body is in the form of a substrate having a thickness 54 ranging from 25 µm to about 1500 µm in thickness. According to a further aspect, the monolithic body 50 can take on other forms, including but not limited to fibers, rods, circular lenses, containers, and other forms amenable to monolithic glass body manufacture.

The monolithic body 50 of the electrically conductive article 100 is generally formed from a glass composition which is ion-exchangeable in order to facilitate the formation of one or more discrete layers of metallic silver in the cross section of the glass substrate, as will be described in more detail herein. Glass compositions suitable for ion exchange generally comprise smaller alkali metal ions, typically $Na^+$ or $Li^+$ ions, that can be exchanged with larger alkali ions such as, for example, potassium, rubidium, and/or cesium ions, or even non-alkali metal ions, such as silver. However, it should be understood that any glass composition suitable for ion exchange can be used to form the conductive articles described herein.

For example, suitable glass compositions that can be used to form the monolithic glass bodies employed in the electrically conductive articles described herein include, without limitation, soda lime glasses, alkali-aluminosilicate glasses, alkali-borosilicate glasses, or any glass composition with a sufficient amount of ions in the glass network to facilitate ion exchange. Exemplary glasses include, without limitation, the glasses disclosed in commonly assigned U.S. Patent Application Publication Nos. 2010/0035038, 2010/0028607, 2010/0009154, 2009/0020761 and 2009/0142568.

In the embodiments described herein, the electrically conductive articles 100 further comprise an electrically conducting element 20 formed within the monolithic body 50. That is, the electrically conductive element 20 is formed within the body 50 such that it is encapsulated or substantially encapsulated within the body 50. Preferably, the degree of encapsulation of the element 20 within the body 50 is such that environmental exposure to the element 20 is eliminated or substantially reduced. In certain embodiments of the articles 100, portions of the electrically conductive element 20 are exposed on one or more edges of the body 50 as sites for electrical interconnections within the device or other article housing the electrically conductive article 100.

Referring again to FIG. 1, the electrically conducting element 20 includes one or more discrete layers 30 of metallic silver, each of which are formed within the monolithic glass body 50. In aspects of the electrically conductive articles 100 with an electrically conducting element 20 having a plurality of layers 30 of metallic silver, each layer 30 is spaced apart from an adjacent layer 30 by a distance 22 (see FIG. 1A). In addition, the first layer 30 within the element 20 is spaced from the first primary surface 12 by a distance 24 (see FIG. 1A). Accordingly, these aspects of the electrically conductive articles 100 with an electrically conducting element 20 having a plurality of layers 30 of metallic silver can possess 2, 3, 4, 5, 6, 7, 8, 9, 10 or more such discrete layers 30 of metallic silver. Other aspects of the electrically conductive articles 100 depicted in FIG. 1 possess an electrically conducting element 20 having one discrete layer 30 of metallic silver (see FIG. 1B). In such cases, the layer 30 is spaced from the first primary surface 12 by a distance 24. By way of further example, FIG. 2A is an SEM micrograph of one exemplary embodiment of an electrically conductive article with a monolithic glass body having an electrically conducting element with a plurality of discrete layers of metallic silver formed beneath the first surface of the glass body. Hence, the exemplary embodiment depicted in FIG. 2A is comparable to the electrically conductive article 100 schematically depicted in FIGS. 1 and 1A.

Advantageously, the one or more discrete layers 30 of metallic silver making up the electrically conductive element 20 within the electrically conductive article 100 depicted in FIG. 1 possess high electrical resistivity. In some aspects, each discrete layer 30 of metallic silver has an electrical resistivity between about 50 nΩ·m and about 2000 nΩ·m. In certain implementations, the layer 30 possesses an electrical resistivity that approaches that of pure silver, ~16 nΩ·m. According to other aspects, each discrete layer 30 exhibits an electrical resistivity between about 100 nΩ·m and about 500 nΩ·m. As the layer or layers 30 of the electrically conducting element 20 are embedded within the monolithic body 50 with limited to no environmental exposure (e.g., oxidative environments), the resistivity of each of these layers should remain fairly constant over the life of the device containing the electrically conductive article 100.

The electrical properties of the electrically conductive article 100 depicted in FIG. 1 are facilitated by the thickness T (i.e., thickness 32) and spacing S (i.e., spacing 22) of the one or more discrete layers 30 of metallic silver of the electrically conducting element 20 formed within the monolithic body 50. In general, the thickness T (i.e., thickness 32) of the discrete layers 30 of metallic silver is less than about 300 nm. For example, in some embodiments described herein, each discrete layer 30 of metallic silver has a thickness T such that $0.1~\mu m \leq T \leq 0.5~\mu m$. In certain implementations, each discrete layer 30 of the plurality of discrete layers of metallic silver generally has a thickness T in the range from about 100 nm to about 250 nm (i.e., $100~nm \leq T \leq 250~nm$). In other embodiments, the thickness T of each discrete layer 30 of the plurality of discrete layers is such that $50~nm \leq T \leq 75~nm$. The spacing S (i.e., spacing 22) between adjacent layers of metallic silver (e.g., for those implementations with an electrically conducting element 20 having two or more discrete layers 30 of metallic silver) is generally less than or equal to 500 nm (i.e., $S \leq 500~nm$). In some embodiments, the spacing S between adjacent layers may be less than or equal to 400 nm (i.e., $S \leq 400~nm$). In some other embodiments, the spacing S may be as small as 100 nm. According to some aspects of the electrically conductive articles 100, the thickness 32 and spacing 22 of the discrete layers 30 of metallic silver are substantially constant throughout the entirety of the article. In other aspects of the articles 100, the thickness 32 and/or spacing 22 of the discrete layers 30 can vary within one or more locations in the article, but generally no more than ±25% of their respective average values.

Referring again to FIG. 1, the electrically conducting element 20, and its one or more discrete layers 30 of metallic silver, are generally spaced apart from the first primary surface 12 of the electrically conductive article 100 such that each discrete layer 30 is contained within the monolithic glass body 50 of the glass article 100 rather than on a surface (e.g., primary surfaces 12, 14) of the article 100. Specifically, the single discrete layer 30 or the first layer 30 of the plurality of discrete layers (i.e., the discrete layer closest to the first surface 12 of the article 100) is spaced apart from the first surface 12 by a distance D (i.e., distance 24). In some aspects, the distance D can be set such that $0.1~\mu m \leq D \leq 20~\mu m$. In some implementations, D is less than or equal to 5 µm for the first discrete layer 30 of metallic silver, and each subsequent discrete layer 30 is spaced apart from one another by the spacing S, i.e., spacing 22. Forming the discrete layers 30 within the monolithic glass body 50 of the article 100 rather than on the surface of the glass body prevents the discrete layers 30 from being damaged, chemically modified, and/or removed from the monolithic glass body, thereby providing for a more robust electrically conductive article 100.

Figure 1D:
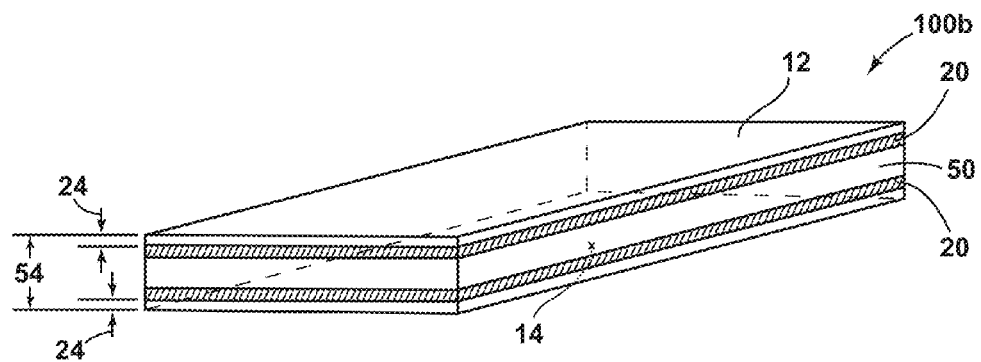
FIG. 1D schematically depicts a perspective view of an electrically conductive article with an electrically conducting elements spaced apart from each of a first and a second primary surface according to a further embodiment of the disclosure.
Figure 2A:
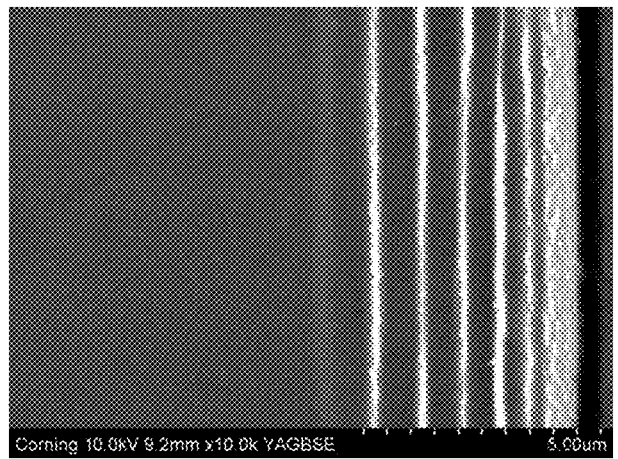
FIGS. 2A-2G are SEM micrographs depicting electrically conductive articles with a discrete layer or a plurality of discrete layers of metallic silver formed in monolithic glass bodies having different glass compositions.
Figure 2B:
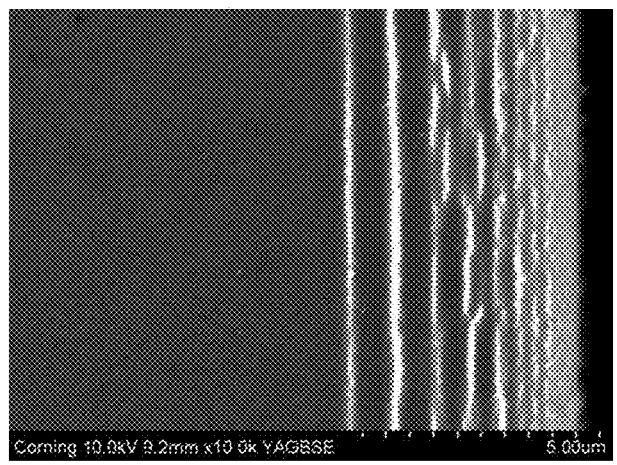
Figure 2C:
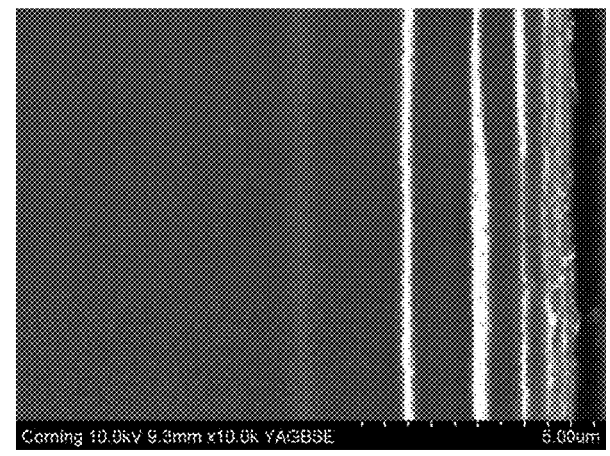
Figure 2D:
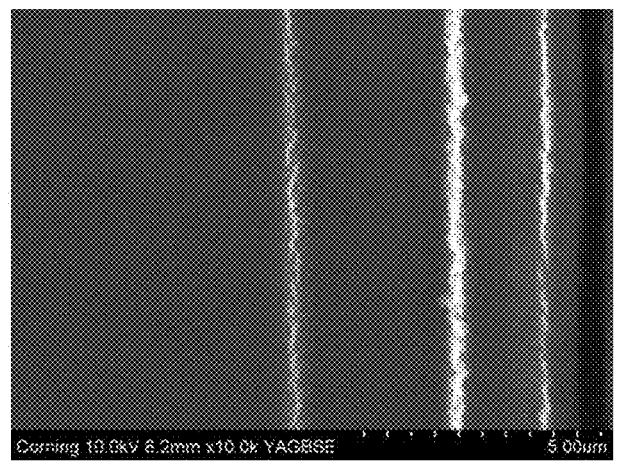
Figure 2E:
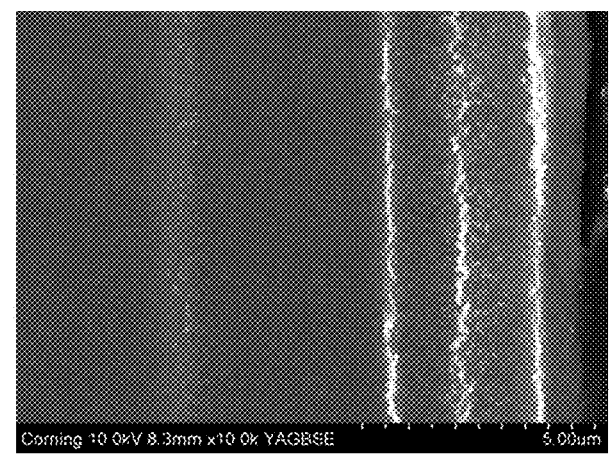
Figure 2F:
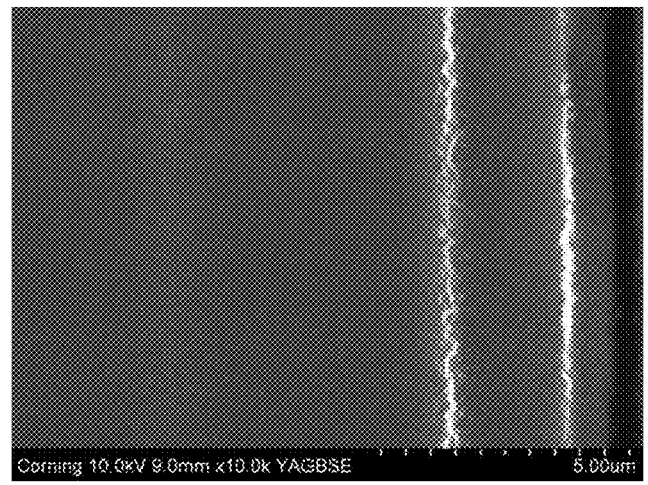
Figure 2G:
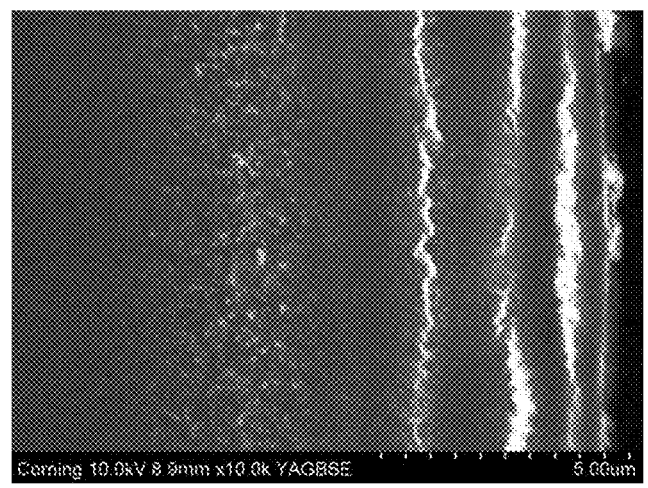
Figure 3A:
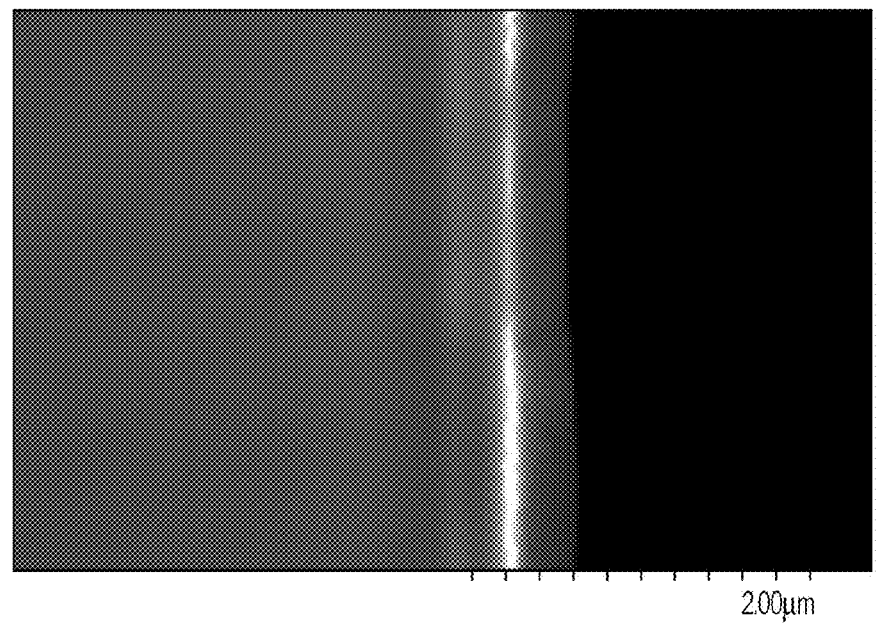
FIGS. 3A-3D are SEM micrographs depicting the formation of a discrete layer of metallic silver and a plurality of discrete layers of metallic silver in a monolithic glass body as a function of different hydrogen treatment times.
Figure 3B:
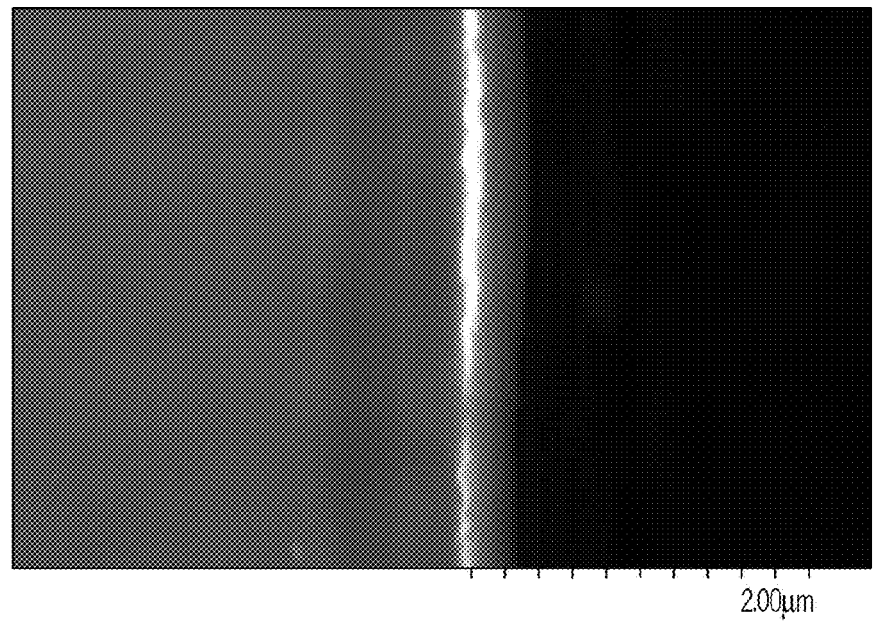
Figure 3C:
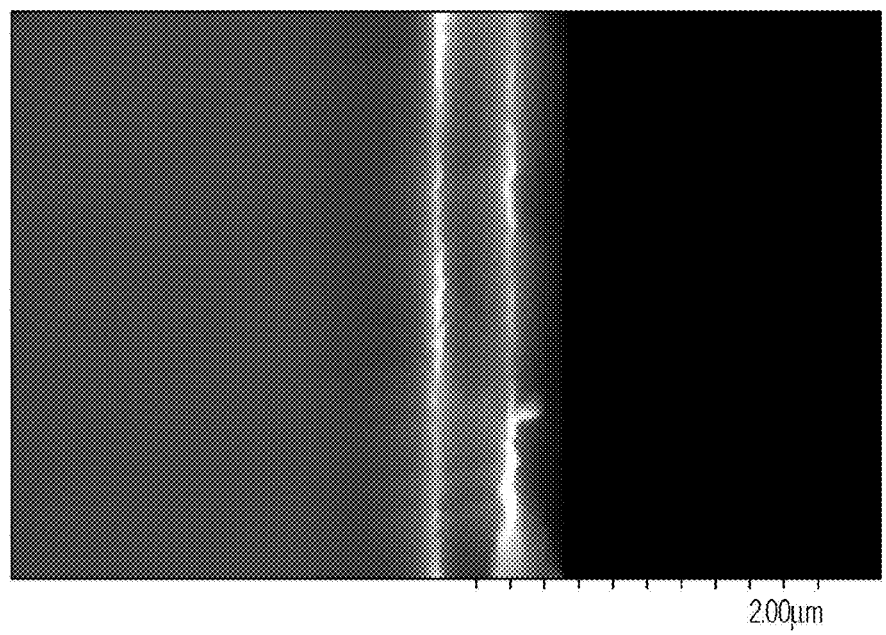
Figure 3D:
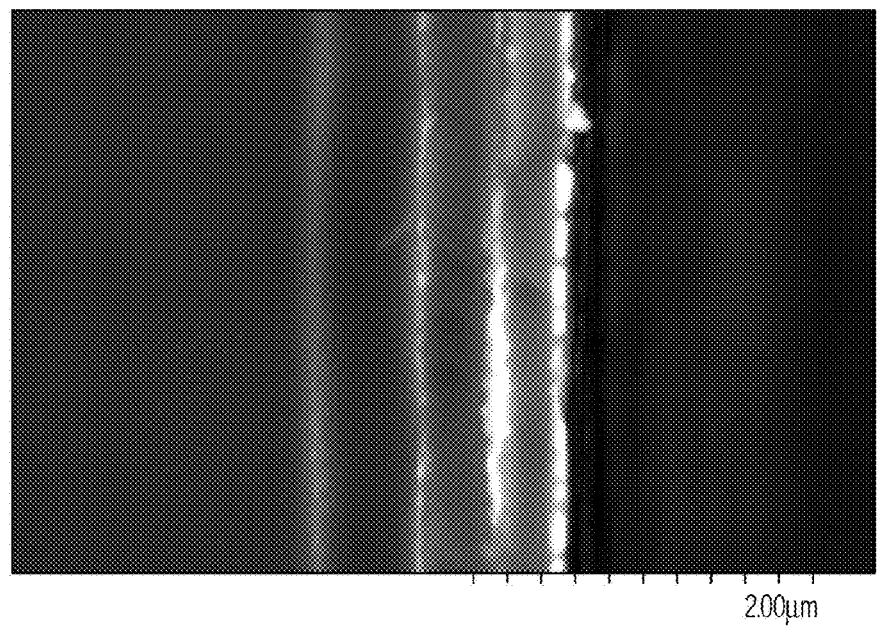

According to other embodiments, electrically conductive articles 100a and 100b are depicted in FIGS. 1C and 1D, respectively. These electrically conductive articles are similar to those depicted in FIGS. 1, 1A and 1B, but reflect variances in the location of the electrically conducting element 20 and the quantity of such elements contained in the article. Accordingly, like-numbered elements associated with the articles 100a and 100b depicted in FIGS. 1C and 1D and the article 100 depicted in FIGS. 1, 1A and 1B have the same or similar characteristics, structure and function, unless otherwise noted. Referring to FIG. 1C, the electrically conductive article 100a has an electrically conducting element 20 that is formed in a monolithic body 50 and spaced apart from the second primary surface 14 by a distance D (i.e., by a distance 24), in which $0.1\ \mu m \leq D \leq 20\ \mu m$. Referring to FIG. 1D, the electrically conductive article 100b has two electrically conducting elements 20 that are formed in a monolithic body 50 and spaced apart from the respective first and second primary surfaces 12, 14 by a distance D (i.e., by a distance 24), in which $0.1\ \mu m \leq D \leq 20\ \mu m$. It should be understood that the dimensions, distance 24, number of layers 30, dimensions of the layers 30 and other characteristics associated with each element 20 can differ between the elements 20 contained in the monolithic body 50 of the electrically conductive article 100b. In sum, the electrically conductive articles 100, 100a and 100b depicted in FIGS. 1-1D are exemplary, but not exhaustive, of various electrically conductive articles with differing quantities and structures associated with the electrically conducting element 20 and discrete layer or layers 30 of metallic silver according to the principles of the disclosure.

Referring again to the electrically conductive articles 100, 100a and 100b depicted in FIGS. 1-1D, the electrically conducting element 20 is shown as extending up to the edges of the monolithic glass body 50 adjacent to its primary surfaces 12, 14. In other aspects, the edges of the electrically conducting element 20 are spaced apart from one or more of the edges adjacent to the primary surfaces of the body 50. Accordingly, some aspects of the electrically conductive articles 100, 100a and 100b of the disclosure possess fully-embedded electrically conductive elements 20 that are spaced apart from the primary surfaces and all of the edges of the article. In some cases, the particular needs of the application employing the electrically conductive article (e.g., particular interconnection locations) drive the design considerations related to the spacing and location of the electrically conductive element 20 within the monolithic glass body 50.

In some embodiments, the electrically conductive articles 100, 100a, and 100b depicted in FIGS. 1 and 1A-1D may further include a layer of compressive stress 60 (see FIGS. 1, 1A-1B) which extends into the monolithic body 50 of the article. The layer of compressive stress 60 extends into the body 50 of the article to a depth of layer 64 (DOL). In embodiments described herein, the depth of layer 64 may be up to about 60 µm or more. For example, in some embodiments the depth of layer 64 may be greater than 65 µm or even greater than 70 µm. The layer of compressive stress 60 generally has a magnitude of compression CS which is greater than or equal to 200 MPa. For example, in some embodiments the magnitude of compression in the layer of compressive stress 60 may be greater than or equal to about 250 MPa or even greater than or equal to about 300 MPa. The magnitude of compression of the layer of compressive stress 60 may be as great as 650 MPa or even 900 MPa. Accordingly, it should be understood that, in some embodiments, the magnitude of the layer of compressive stress 60 may be in the range from about 200 MPa to about 900 MPa. The layer of compressive stress 60 generally increases the strength of the monolithic glass body 50 of the articles 100, 100a, and 100b. As such, the layer of compressive stress 60 enables the article to withstand a greater degree of surface damage, such as scratches, abrasions, and the like, without catastrophic failure.

While the electrically conductive articles 100, 100a, and 100b described herein as having a layer of compressive stress 60 with a depth of layer 64 of 60 µm and a magnitude of greater than 200 MPa, it should be understood that the layer of compressive stress 60 may have a depth of layer 64 of less than 60 µm and a magnitude of compression of less than 200 MPa. Moreover, it should be understood that, in some embodiments, the electrically conductive articles 100, 100a and 100b are formed without a layer of compressive stress, such as when the article is utilized in applications which do not require that the monolithic glass body 50 of the article have enhanced strength.

When the electrically conductive articles 100, 100a or 100b include a layer of compressive stress 60, the layer of compressive stress may be formed in the monolithic glass body 50 prior to formation of the electrically conducting element 20, and one or more of the discrete layers 30 of metallic silver. For example, in some embodiments, the plurality of discrete layers 30 of metallic silver may be formed in the monolithic glass body 50 which is compressively stressed in its as-received condition, such as when the article is manufactured from commercially available glass bodies having a layer of compressive stress. Examples of such glass bodies include substrates of Gorilla® Glass manufactured by Corning®, Inc.

However, in other embodiments, the electrically conductive articles 100, 100a or 100b may initially be without a layer of compressive stress 60 in its as-received condition. In these embodiments, the layer of compressive stress 60 may be introduced into the monolithic glass body 50 of the article before one or more of the discrete layers 30 of metallic silver are formed in the body 50. In some embodiments, the layer of compressive stress 60 may be induced in the monolithic body 50 of the conductive article 100, 100a or 100b by thermal tempering. In other embodiments, the layer of compressive stress 60 may be induced in the article by chemical tempering, such as when the article is subjected to an ion exchange treatment.

For example, the monolithic body 50 of the electrically conductive article 100, 100a or 100b may be formed from a glass composition which is suitable for ion exchange, as noted above. In one embodiment, the layer of compressive stress 60 is induced in the monolithic glass body 50 by positioning the glass body 50 in a bath of molten salts, such as alkali metal salts. In this embodiment, the relatively larger alkali ions in the molten salt are exchanged with the relatively smaller sodium and/or lithium ions in the glass body 50 of the article 100, 100a or 100b. The resulting exchange of larger ions for smaller ions induces the compressive stress in the glass network of the monolithic glass body of the article.

In one embodiment, the molten salt bath used for ion exchange contains $KNO_3$. The potassium ions in the $KNO_3$ are exchanged with smaller sodium ions in the monolithic glass body thereby compressively strengthening the electrically conductive article 100, 100a or 100b. The temperature of the salt bath may be in the range from about 250° C. to about 500° C. In some embodiments, the temperature of the salt bath may be in the range from about 300° C. to about 450° C. In order to achieve the desired depth of layer 64 and magnitude of compression CS, the monolithic glass body 50 of the electrically conductive article 100, 100a or 100b may be held in the molten salt bath from about 4 hours to about 11 hours. In some other embodiments the hold time may be from about 4 hours to about 7 hours in order to achieve the desired depth of layer 64 and magnitude of compression.

Alternatively, the layer of compressive stress 60 may be introduced in the monolithic glass body 50 at the same time the silver is introduced into the glass body but before the one or more discrete layers 30 of silver are formed in the monolithic body 50 of the electrically conductive article 100, 100a and 100b.

The one or more discrete layers 30 of metallic silver are formed in the monolithic glass body 50 of the electrically conductive articles 100, 100a and 100b by utilizing an ion exchange treatment in conjunction with a thermal treatment performed in a reducing atmosphere. In one embodiment, the silver ions are introduced in the monolithic glass body 50 by positioning the glass body in a molten salt bath containing silver ions to facilitate the exchange of the silver ions in the salt bath with ions in the glass article, such as sodium and/or lithium ions. In another embodiment, the silver ions are introduced in the glass body 50 in the article 100, 100a or 100b by applying a coating containing silver to a surface (e.g., primary surface 12) of the glass body 50 and heating the monolithic glass body 50 with the coating to promote the exchange of silver ions in the coating with ions in the glass body 50, such as sodium and/or lithium ions. The coating may be a paste comprising silver or a silver compound. Alternatively, the coating may be a thin film comprising silver or a silver compound which is deposited on the glass body 50 by sputtering, vacuum deposition or a similar technique.

More specifically, in one embodiment of the articles 100, 100a and 100b, silver ions are introduced in the monolithic glass body 50 through an ion exchange process which is performed in a bath of molten salt. The salt bath generally contains a silver salt, such as $AgNO_3$, AgCl or the like, in addition to an alkali salt. For example, in one embodiment the molten salt bath comprises from about 0.05 wt. % to about 5 wt. % of a silver salt, such as $AgNO_3$ or the like, and from about 95 wt. % to about 99.5 wt. % of $MNO_3$, wherein M is an alkali metal ion such as such as, for example, potassium, sodium, rubidium, and/or cesium ions. In the embodiments described herein, M is either potassium or sodium. However, it should be understood that other alkali metal ions may be used in the salt bath which contains silver.

In embodiments where the electrically conductive article 100, 100a or 100b includes monolithic glass body 50 having a layer of compressive stress 60 that is formed prior to exposure to the salt bath comprising silver ions, the alkali metal ion in the salt bath containing silver is potassium. However, in embodiments where the article 100, 100a or 100b does not have a monolithic glass body 50 possessing a layer of compressive stress 60 prior to exposure to the salt bath comprising silver ions, the alkali metal ion in the salt bath containing silver may be either sodium or potassium. In other embodiments, potassium may be utilized as the alkali metal ion in the salt bath containing silver when it is desired to form a layer of compressive stress 60 in the monolithic glass body 50 through the exchange of sodium ions in the glass with potassium ions in the salt bath in addition to introducing silver ions into the monolithic glass body 50 of the electrically conductive article at the same time.

The salt bath containing silver ions is maintained at a bath temperature from about 300° C. to about 500° C. to facilitate the ion exchange process. In some embodiments, the bath temperature may be from about 300° C. to less than or equal to about 450° C. to facilitate the ion exchange process. The monolithic glass body 50 of the electrically conductive article 100, 100a or 100b is held in the salt bath containing silver ions for an ion exchange period P which is greater than or equal to about 5 minutes and less than or equal to 1 hour in order to achieve the desired concentration of silver ions in the monolithic glass body 50 of the article 100, 100a or 100b. In some embodiments the ion exchange period P may be less than or equal to 0.5 hours or even less than or equal to 0.25 hours. The temperature of the salt bath containing silver ions and the ion exchange period P may be adjusted to obtain the desired concentration of silver ions. Following the ion exchange process, the monolithic glass body 50 of the article 100, 100a or 100b may be substantially clear or have a slightly yellow tint as a result of the presence of the silver ions in the monolithic glass body 50. In certain aspects, the concentration profile of the silver ions developed in the monolithic glass body 50 influences the electrical resistivity, spacing and thickness associated with the discrete layer or layers 30 of the metallic silver developed in the monolithic glass body 50.

After the silver ions are introduced into the monolithic glass body 50 of the article 100, 100a or 100b, the article is removed from the bath and positioned in a reducing atmosphere, such as flowing hydrogen gas, and simultaneously heated to promote the precipitation and growth of metallic silver in the monolithic glass body 50 of the article 100, 100a, or 100b which subsequently creates the one or more discrete layers 30 of metallic silver formed in the monolithic glass body, as depicted in FIGS. 1 and 1A-1C. The combination of the ion exchange time in the salt bath containing silver ions, bath concentrations, bath temperature, treatment time in the reducing atmosphere and reducing temperature can dictate the number of discrete layers 30 formed in the monolithic glass body 50, along with their respective thicknesses and spacing within the body 50.

For example, the monolithic glass body 50 may be positioned in a tube furnace through which hydrogen gas is flowing. The glass body 50 is then heated to a reducing temperature which is from about 250° C. to about 600° C. and held at this temperature for a treatment period Q which is greater than or equal to 5 minutes and less than or equal to about 50 hours. In general, longer reduction times and/or higher reducing temperatures result in the development of higher numbers of discrete layers 30 of metallic silver within the monolithic glass body 50. Also, higher initial concentrations of silver ions placed into the monolithic body 50 prior to the reduction step can correlate to larger thickness values for a given discrete layer 30 of metallic silver. In embodiments where the electrically conductive article 100, 100a or 100b includes a layer of compressive stress 60 developed before or simultaneously with the introduction of silver ions into the article, the reducing temperature is generally controlled to less than or equal to about 300° C. to minimize the relaxation of the compressive stress.

While not wishing to be bound by theory, the formation of one or more discrete layers 30 of metallic silver in the monolithic glass body 50 during the reduction treatment involves nucleation of metallic silver in the glass body and the growth of the metallic silver into the one or more discrete layers of metallic silver. Various factors can influence or otherwise control these processes including but not limited to the dimensions of the glass body 50, the reducing atmosphere, the reducing temperature, the concentration of silver ions present in the body 50 from prior ion exchange steps, the concentration of hydrogen ions in the glass body 50 and the composition of the glass body 50. Consequently, certain relationships between the concentration of silver and the concentration of hydrogen in the glass body must be satisfied in order to initiate and maintain growth of one or more discrete layers of metallic silver.

EXAMPLES

The embodiments described herein will be further clarified by the following examples.

Example 1

Nine glass plates designated Samples 2A, 2B, 2C, 2D, 2E, 2F, and 2G were formed from respective Corning® Gorilla® glass or comparable compositions, each ion-exchangeable, alkali-aluminosilicate glass compositions. These glass compositions are detailed in U.S. patents and patent applications as follows, the salient contents of which are incorporated by reference within this disclosure: U.S. Pat. No. 8,158,543, issued on Apr. 17, 2012 (Sample 2A); U.S. Pat. No. 8,802, 581, issued Aug. 12, 2014 (Sample 2B); U.S. Patent Application Publication No. 2013/0004758, published on Jan. 3, 2013 (Sample 2C); U.S. Pat. No. 8,951,927, issued on Feb. 10, 2015 (Sample 2D); U.S. Pat. No. 8,586,492, issued on Nov. 19, 2013 (Sample 2E); U.S. Patent Application Publication No. 2014/0106172, published on Apr. 17, 2014 (Sample 2F); and U.S. Pat. No. 8,765,262, issued on Jul. 1, 2014 (Sample 2G). These glass plates were ion exchanged in a molten salt bath comprising 5 wt. % $AgNO_3$ and 95 wt. % $KNO_3$ for 30 minutes at a temperature of 350° C. to introduce silver ions into the samples. None of the samples were ion exchanged prior to immersion in the $AgNO_3/KNO_3$ bath. Thereafter, the samples were treated in flowing hydrogen gas at a temperature of 400° C. for 10 hours to facilitate the formation of one or more discrete layers of metallic silver in each sample.

Referring to FIGS. 2A-2G, a micrograph of a cross section of each of the Samples 2A-2G was then captured with a scanning electron microscope (SEM) to document the nature of the discrete layers of metallic silver formed as a function of glass substrate composition in view of the constant ion exchange and hydrogen reduction treatment conditions. The discrete layers of metallic silver appear as bright bands and/or regions in the SEM images. It is evident from FIGS. 2A-2G that the quantity and structure of the discrete layers of metallic silver can be varied through selection of the composition of the monolithic glass body.

Example 2

Four glass plates (Samples A, B, C and D) formed from Corning® glass code 2317 ion-exchangeable, alkali-aluminosilicate glass commercially available from Corning®, Inc. were ion exchanged in a molten salt bath comprising 5 wt. % $AgNO_3$ and 95 wt. % $NaNO_3$ for 5 minutes at a temperature of 410° C. to introduce silver ions into the samples. None of the samples were ion exchanged prior to emersion in the $AgNO_3/NaNO_3$ bath. Thereafter, the samples were treated in flowing hydrogen gas at a temperature of 400° C. to facilitate the formation of a one discrete layer and multiple discrete layers of metallic silver in the samples. Sample A was treated for 10 minutes; Sample B was treated for 15 minutes; Sample C was treated for 25 minutes; and Sample D was treated for 60 minutes. An SEM image of a cross section of each sample was then captured with a scanning electron microscope to document the development of one and multiple discrete layers of metallic silver as a function of the hydrogen treatment time.

FIGS. 3A-3D are SEM micrographs through the cross section of Samples A-D, respectively. The discrete layers of metallic silver appear as bright bands and/or regions in the SEM images. As illustrated by FIGS. 3A-3D, increasing the hydrogen treatment time results in the formation of more discrete layers of metallic silver, i.e., from one discrete layer of metallic silver (see FIGS. 3A and 3B), two discrete layers of metallic silver (see FIG. 3C) and four discrete layers of metallic silver (see FIG. 3D).

Figure 4A:
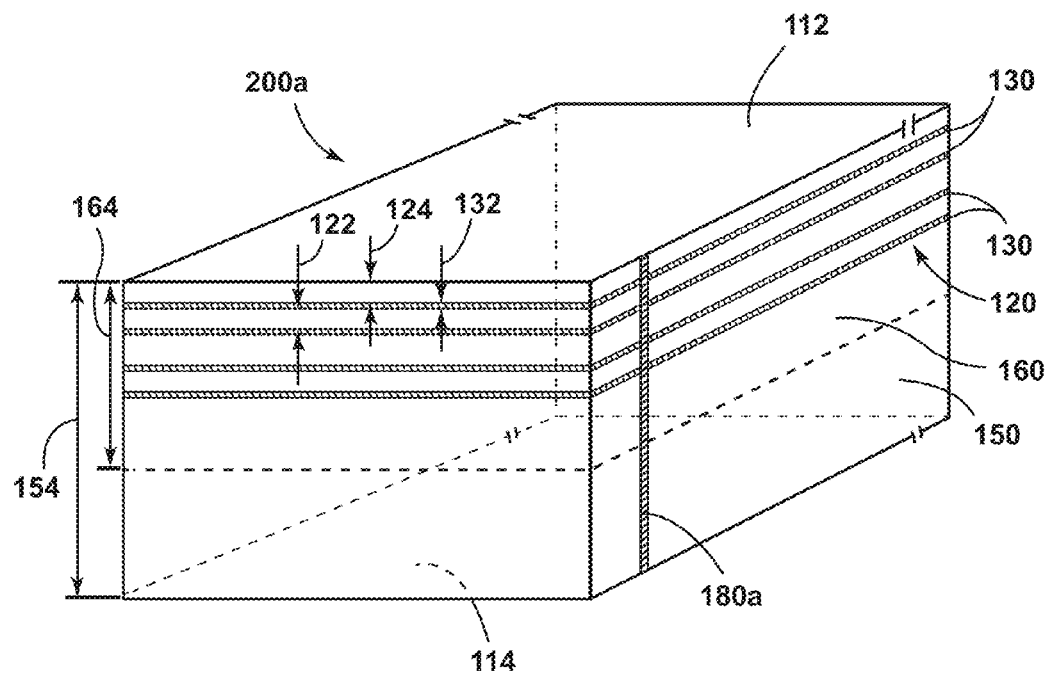
FIGS. 4A-4B schematically depict a perspective view of electrically conductive articles configured as an antenna assembly with different interconnection configurations according to embodiments of the disclosure.
Figure 4B:
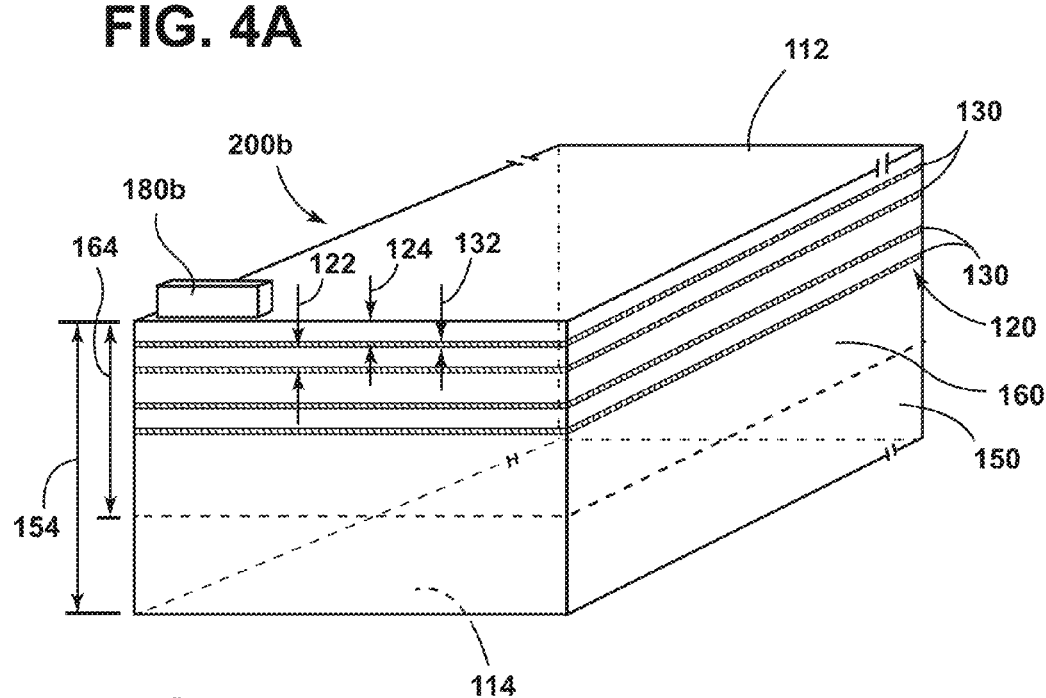

Now referring to FIGS. 4A and 4B, another aspect of the disclosure relates to electrically conductive articles that are configured to include antenna assemblies 200a and 200b. In particular, antenna assemblies 200a and 200b include an electrically conducting element 120 and a monolithic glass body 150. The antenna assemblies 200a and 200b have features that are comparable to the electrically conductive articles 100, 100a and 100b outlined in the foregoing. In particular, the antenna assemblies generally comprise a first surface 112, a second surface 114 and a monolithic body 150 which extends from the first surface 112 to the second surface 114. The monolithic body 150 and antenna assemblies 200a and 200b are further defined by a thickness 154. In addition, the monolithic body 150 is continuous with the first surface 112 and the second surface 114 such as when the body is formed from a single piece of glass.

The monolithic glass body 150 of the assemblies 200a and 200b may have a variety of different forms. For example, in some embodiments, the first surface 112 and the second surface 114 may be parallel with one another such as when the assemblies 200a and 200b are employed in as a display substrate in a display device (e.g., mobile phone). Alternatively, the antenna assemblies may have some degree of curvature along their length and/or width dimensions, such as when the assemblies are employed in a curved display of a mobile phone with curved external features. In some implementations of the antenna assemblies 200a and 200b depicted in FIGS. 4A and 4B, the monolithic glass body 150 is in the form of a substrate having a thickness 154 ranging from 25 μm to about 1500 μm in thickness. According to another aspect, the monolithic body 150 can take on other forms amenable to monolithic glass body manufacture and final device configurations employing an embedded antenna assembly or array including, but not limited to, fibers, rods, circular lenses and containers.

Referring again to FIGS. 4A and 4B, the monolithic body 150 employed in the antenna assemblies 200a and 200b has the same composition and structure as the monolithic body 50 employed in the electrically conductive articles 100, 100a and 100b outlined in the foregoing. Similarly, the electrically conducting element 120 and one or more discrete layers 130 of metallic sliver employed in the assemblies 200a and 200b share the same characteristics and processing as the electrically conducting element 20 and discrete layer or layers 30 employed in the foregoing articles 100, 100a and 100b. Accordingly, the discrete layers 130 of the conducting element 120 of the antenna assemblies 200a and 200b are governed by a thickness 132, spacing 124 to the first surface 112 and spacing 122 between adjacent layers 130, all of which are comparable in structure and processing to the respective thickness 32 and spacings 22 and 24 described in connection with the foregoing discrete layers 30 employed in the articles 100, 100a and 100b. In addition, some implementations of the antenna assemblies 200a and 200b employ a layer of compressive stress 160 having a depth of layer 164 comparable in structure and processing to the respective layer of compressive stress 60 and depth of layer 64 of the electrically conductive articles 100, 100a and 100b described in the foregoing.

The antenna assemblies 200a and 200b respectively depicted in FIGS. 4A and 4B possess different interconnection schemes associated with their electrically conducting elements 120 and one or more discrete layers 130 of metallic silver. The antenna assembly 200a, for example, employs a direct electrical connection 180a to its electrically conducting element 20 and each of its discrete layers 130 of metallic silver. As depicted in FIG. 4A, the electrical connection 180a is arranged on one of the edges of the monolithic body 150 of the assembly 200a. It should be understood that the connection 180a can be placed on other locations of the body 150 where the conducting element 20 and the discrete layer or layers 130 are available for direct interconnection (i.e., at portions of the element 20 and layers 30 that are not fully embedded in the body 150). Suitable methods for placing the connections 180a on the body 150 include but are not limited to electroplating, sputtering, chemical vapor deposition, etching, cutting, scratching, combinations thereof and other methods understood by those in the field of the disclosure. In certain aspects, the connection 180a can be configured to provide an electrical waveguide coupling between the electrically conducting element 20 and another data, waveguide and/or electrical transmission element.

Another interconnection scheme is apparent with the antenna assembly 200b depicted in FIG. 4B. In this antenna assembly, an electrical connection to the electrically conducting element 120 and its one or more discrete layers 130 of metallic silver is effected through a capacitive coupling element 180b. The capacitive coupling element 180b does not require direct physical contact with the conducting element 120 and the discrete layers 130; consequently, it may be placed on or near the monolithic glass body 150 with sufficient proximity to the element 120 and the layer or layer 130 to effect a capacitive coupling interconnection. An advantage of antenna assembly 200b is that its capacitive coupling element 180b can be configured with a tuned capacitance value to cancel undesired impedance from wire inductance. In addition, the surface area of the primary surface 112 (or primary surface 114 in alternative embodiments) of the monolithic glass body 150 can also be adjusted to tune the capacitance level.

Figure 4C:
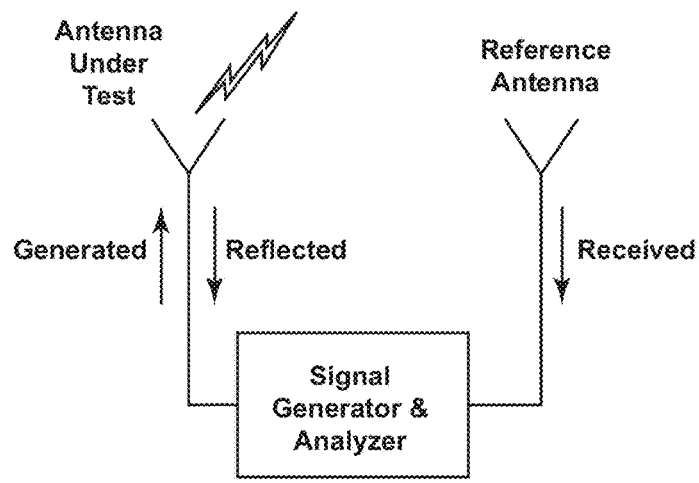
FIG. 4C schematically depicts a test setup to reflected and received power for an electrically conductive article configured as an antenna assembly according to an embodiment of the disclosure.

Referring to FIG. 4C, a test setup is depicted for measuring the reflected and received power for an electrically conductive article configured as an antenna assembly (e.g., assemblies 200a and 200b). More specifically, the setup depicted in FIG. 4C is used to compare the reflected and received power for antenna assemblies according to the disclosure (i.e., the "Antenna Under Test" in FIG. 4C) with a commercially-available antenna assembly (i.e., the "Reference Antenna" in FIG. 4C). Both reflected and received signals are captured by the signal generator and analyzer depicted in FIG. 4C. The reflected signal quantifies the operating band of the antenna assembly, but is not sensitive to whether radiation is prevented by excessive antenna loss. On the other hand, the received signal confirms that presence of radiation.

Figure 4D:
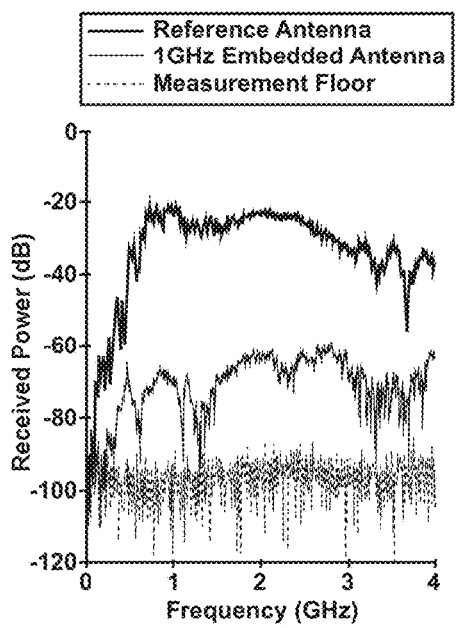
FIG. 4D is a plot of received power as a function of test frequency for an electrically conductive article tested with the setup depicted in FIG. 4C.

As shown in FIG. 4D, the received power (dB) as a function of test frequency (GHz) for an electrically conductive article configured in the form of an antenna assembly according to the disclosure is shown in comparison to a commercially-available antenna. The measurement results depicted in FIG. 4D were generated by testing an antenna assembly according to the disclosure (i.e., the "1 GHz Embedded Antenna" in FIG. 4D) and a commercially-available antenna (i.e., the "Reference Antenna" in FIG. 4D) using the setup depicted in FIG. 4C. The results provided in FIG. 4D directly confirm the presence of radiation associated with the antenna assembly according to the disclosure. In particular, the received power (dB) for the "1 GHz Embedded Antenna" sample exceeds the background noise (i.e., "Measurement Floor" in FIG. 4D). In addition, the received power of the "1 GHz Embedded Antenna" remains lower than the "Reference Antenna" in FIG. 4D, but this result is also believed to be the result of (1) divergent performance at low-frequencies (well below 1 GHz) where the embedded antenna assemblies of the disclosure are not ideally-suited (see FIG. 4F and corresponding description below), and (2) a lack of engineering optimization associated with the particular embedded antenna sample ("1 GHz Embedded Antenna") in comparison to the commercially-available antenna ("Reference Antenna") tested with the FIG. 4C setup.

Figure 4E:
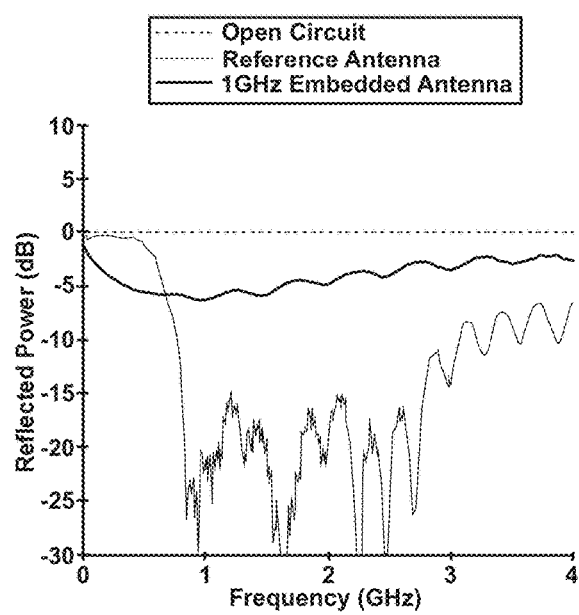
FIG. 4E is a plot of reflected power as a function of test frequency for an electrically conductive article tested with the setup depicted in FIG. 4C.

As shown in FIG. 4E, the reflected power (dB) as a function of test frequency (GHz) for an electrically conductive article configured in the form of an antenna assembly according to the disclosure is shown in comparison to a commercially-available antenna. The measurement results depicted in FIG. 4E were generated by testing an antenna assembly according to the disclosure (i.e., the "1 GHz Embedded Antenna" in FIG. 4E) and a commercially-available antenna (i.e., the "Reference Antenna" in FIG. 4E) using the setup depicted in FIG. 4C. The reflected power provides a measure of the operating band of the particular antenna on test. FIG. 4E demonstrates that the "1 GHz Embedded Antenna" sample, indicative of an antenna assembly 200a or 200b, operates near 1 GHz because the reflected power is relatively low compared to an open circuit (i.e., "Open Circuit" in FIG. 4E). In addition, the reflected power of the "1 GHz Embedded Antenna" remains higher than the "Reference Antenna" in FIG. 4E, but this result is believed to be a reflection of a lack of engineering optimization associated with the particular embedded antenna sample ("1 GHz Embedded Antenna") in comparison to the commercially-available antenna ("Reference Antenna") tested with the FIG. 4C setup.

The antenna assemblies 200a and 200b possess many advantages over commercially-available antenna assemblies employing glass substrates with an antenna element mounted on one or more of their exterior surfaces. These advantages include: smaller antenna sizes, improved final product appearance, less propensity for environmental degradation and shape flexibility. Smaller antenna sizes are feasible with the assemblies 200a and 200b as encapsulating the electrically conductive element 120 (serving as the antenna) within the monolithic glass body 150 provides higher dielectric loading compared to mounting the element on the surface of the glass as in a convention antenna design. The antenna assemblies 200a and 200b can have an improved final product appearance as their exterior surfaces (e.g., primary surfaces 112 and 114) are not disturbed by the presence of a surface-mounted antenna component. Further, the assemblies 200a and 200b have superior environmental resistance as their electrically conducting elements 120 are fully or substantially embedded within the monolithic glass body 150. In addition, the electrically conducting element 120 and discrete layer or layers 130 of metallic silver can be introduced after the formation of the glass body 150, facilitating antenna assemblies 200a and 200b with varied shapes, including assemblies configured with a flexible monolithic glass body (e.g., glass thicknesses on the order of 25 µm to 150 µm). In contrast, commercially-available antenna design options are often limited by particular fixture designs and processes associated with placing the antenna element on the surface of a substrate with particular dimensions.

Figure 4F:
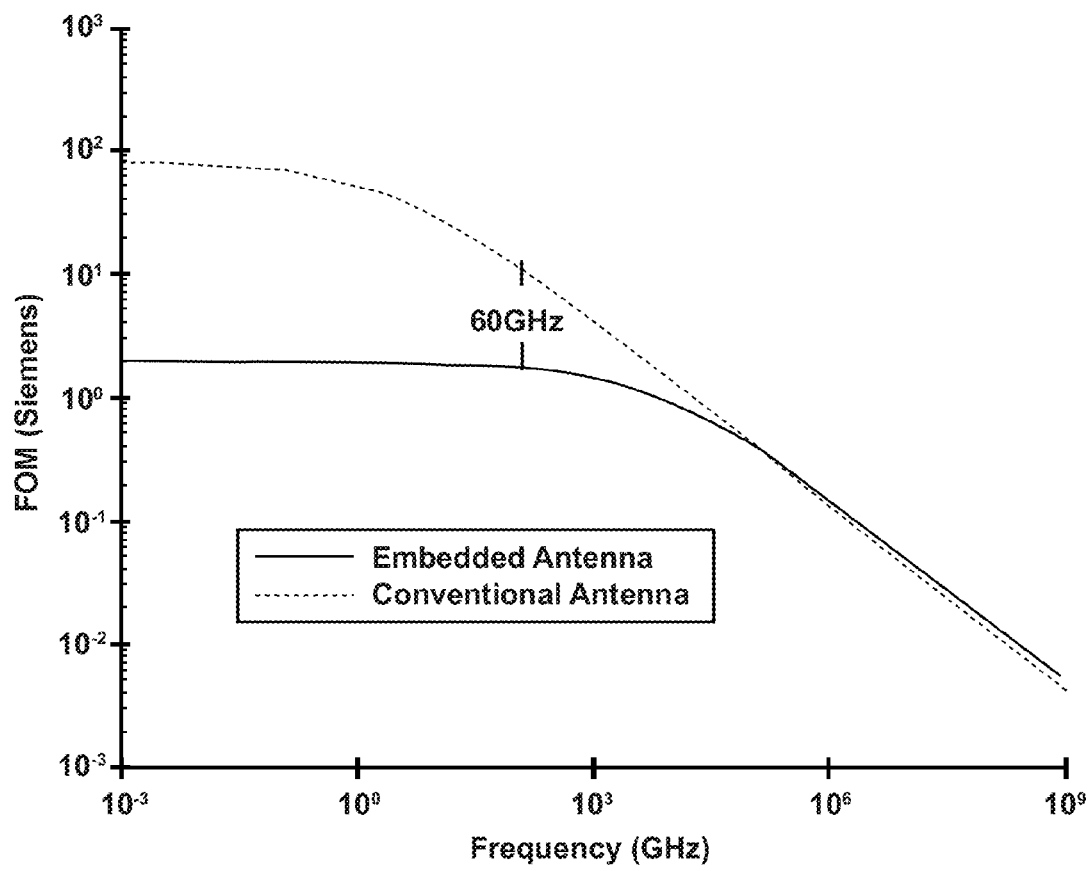
FIG. 4F is a plot of a figure of merit for power consumption as a function of test frequency for an antenna assembly according to an embodiment of the disclosure and a conventional antenna assembly.

The foregoing advantages of the antenna assemblies 200a and 200b (e.g., smaller antenna sizes, product appearance, environmental resistance, and shape flexibility) relative to commercially-available antenna designs are not offset by performance differences. In particular, the antenna assemblies 200a and 200b demonstrate comparable antenna-related performance at frequencies of 60 GHz and higher to commercially-available designs. FIG. 4F demonstrates this point by depicting an estimated figure of merit (in Siemens) as a function of frequency (GHz) for an antenna assembly according to the disclosure with an electrically conducting element formed within a monolithic glass body ("Embedded Antenna") and a commercially-available (e.g., a conventional, known antenna design) having a conductive element mounted or otherwise attached to the surface of a glass substrate ("Conventional Antenna"). Equations (1), (2) and (3) below were employed to calculate and arrive at the plot depicted in FIG. 4F. Equation (1) is given by:

$$FOM_{antenna\ performance}(f) = \frac{Thickness_{Effective}(f) * N}{\rho} \quad (1)$$

where $FOM_{antenna\ performance}(f)$ (in Siemens) is the figure of merit ("FOM") in the Y-axis of FIG. 4F, f is the antenna operating frequency (GHz), $\rho$ is the material resistivity, $Thickness_{Effective}$ is the effective thickness of each conducting layer (e.g., discrete layer 30 of metallic silver), and N is the number of conducting layers. Equation (2) is given by:

$$Skin\ Depth(f) = \sqrt{\frac{\rho}{\pi f \mu_o}} \quad (2)$$

where Skin Depth is a measure of the decrease in electrical conduction associated with the amount of the inner conductor material that is shielded from an electromagnetic standpoint by the skin or surface of the conductor, and $\mu_o$ is the magnetic constant. Equation (3) is given below:

$$\frac{1}{Thickness_{Effective}(f)} \cong \frac{1}{Thickness_{Actual}} + \frac{1}{2 * Skin\ Depth(f)} \quad (3)$$

which provides an approximate formula for the effective thickness that reproduces zero frequency and infinite-frequency behavior.

In using Equations (1), (2) and (3), certain constants for the "Embedded Antenna" and "Conventional Antenna" traces were necessary for the calculations to prepare the plot shown in FIG. 4F. Table 1 provides the exemplary constants that were employed to develop the plot in FIG. 4F for the two antenna designs in the comparison. Note that the constants provided in Table 1 are not necessarily indicative of the actual samples tested in according to the FIG. 4C set up with results depicted in FIGS. 4D and 4E. Referring to Table 1, the bulk resistivity, $\rho_{bulk}$, of pure silver is 16 nΩ·m, as reported in the public literature. In addition, an electrical resistivity of a discrete layer of metallic silver (e.g., a discrete layer 30 of the articles 100, 100a and 100b) was measured at about 2000 nΩ·m (i.e., 125*$\rho_{bulk}$) and a value of about 48 nΩ·m (i.e., 3*$\rho_{bulk}$) was employed for the conducting element of the commercially-available, conventional antenna based on a reported value for silver ink. In general, the results of the plot in FIG. 4F and values in Table 1 demonstrate that the antenna assemblies (e.g., assemblies 200a and 200b) according to the disclosure possess one or more discrete layers of metallic silver with higher bulk resistivity than the silver inks employed in a commercially-available antenna. Nevertheless, the power loss at high antenna frequencies of 60 GHz or greater is not significantly reduced for the antenna assemblies of the disclosure (e.g., assemblies 200a and 200b) because these assemblies advantageously can employ multiple discrete layers of metallic silver which effectively offset any reductions associated with the increased bulk resistivity of the layers compared to a silver conductive element mounted to an exterior surface of a commercially-available antenna design. In certain aspects, the antenna assemblies 200a and 200b are configured to maximize antenna performance at 60 GHz or greater. This high frequency FOM is derived by applying Equations (1), (2) and (3), as limited by skin depth (not thickness), to arrive at Equation (4):

$$FOM_{antenna\ performance}(f \to \infty) = \quad (4)$$
$$\frac{2 * Skin\ Depth(f) * N}{\rho} = \frac{2}{\sqrt{\pi f \mu_o}} \frac{N}{\sqrt{\rho}}$$

in which $N/\rho^{1/2}$ becomes the figure of merit ("FOM") for the fabricated conducting layers for a given antenna frequency, f.

In a preferred aspect, the antenna assemblies and their respective electrically conductive elements are configured such that $N/\rho^{1/2}$ is about 0.14 (nΩ·m)$^{-1/2}$ to 0.18 (nΩ·m)$^{-1/2}$ when the assembly is operating at 60 GHz or greater, in which $\rho$ denotes the electrical resistivity of each discrete layer of metallic silver (nΩ·m) and N denotes the number of discrete layers of metallic silver in the electrically conducting element of the antenna assembly (N≥1). In other implementations, the antenna assemblies and their respective electrically conductive elements are configured such that $N/\rho^{1/2}$ is greater than or equal to about 0.14 (nΩ·m)$^{-1/2}$, or greater than or equal to 0.18 (nΩ·m)$^{-1/2}$ in certain cases, when the assembly is operating at 60 GHz or greater.

TABLE 1

| Antenna Fabrication Approach | Number of Silver Layers, N | Actual Layer Thickness (µm) | Electrical Resistivity, ρ (nΩ · m) |
|---|---|---|---|
| Embedded Antenna example in FIG. 4F | 8 | 0.5 | 2000 |
| Conventional Antenna example in FIG. 4F | 1 | 4 | 50 |

Figure 5:
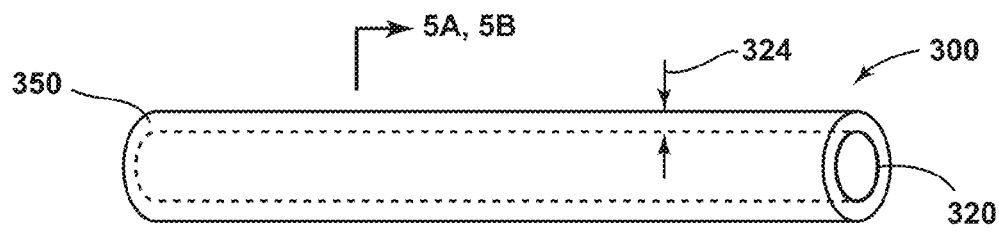
FIG. 5 schematically depicts a perspective view of an electrically conductive article configured as a fiber according to one or more embodiments of the disclosure.
Figure 5A:
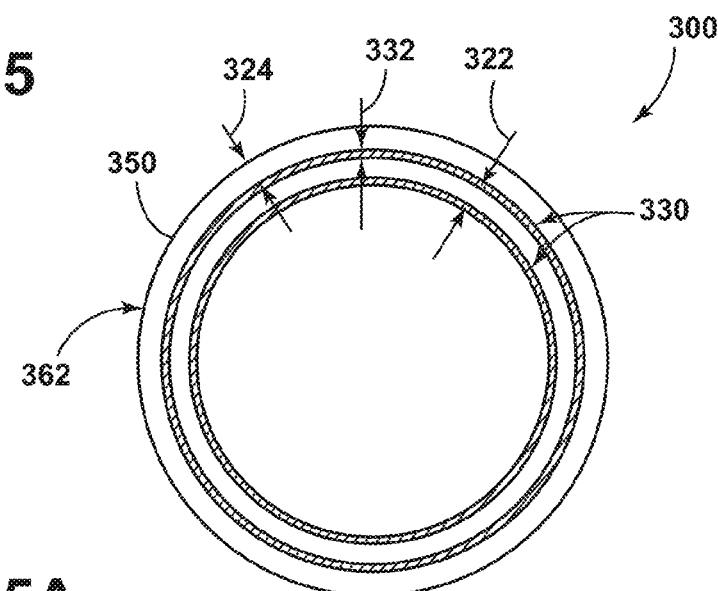
FIG. 5A is a cross-section of the fiber schematically depicted in FIG. 5 having a plurality of discrete metallic silver layers according to an embodiment of the disclosure.
Figure 5B:
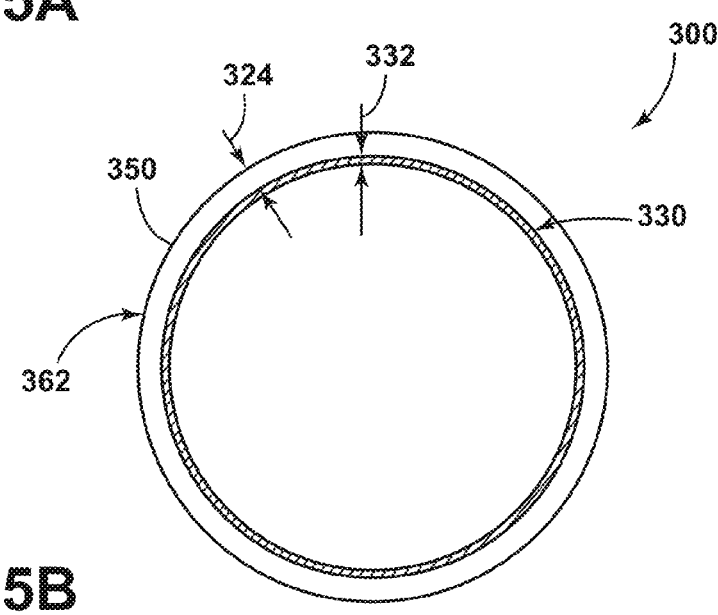
FIG. 5B is a cross-section of the fiber schematically depicted in FIG. 5 having a discrete metallic silver layer according to an embodiment of the disclosure.

Now referring to FIGS. 5, 5A and 5B, another aspect of the disclosure relates to electrically conductive articles that are configured to include a fiber assembly 300. In particular, the fiber assembly 300 includes an electrically conducting element 320 and a monolithic glass body 350. The fiber assembly 300 has features that are comparable to the electrically conductive articles 100, 100a and 100b outlined in the foregoing. In particular, the fiber assembly generally comprises a first primary surface 362 (e.g., an outer cladding surface) and a monolithic body 350 which extends from the first surface 362 to the central axis of fiber core.

The monolithic glass body 350 of the fiber assembly 300 can have a variety of different fiber-like forms, including forms amenable for use of the fiber assembly 300 as an electrical cable, optical fiber, conduits and other end product applications requiring an electrical connection and/or data transmission means between two points. In some implementations, the monolithic body 350 and the fiber assembly 300 are further defined by a diameter, typically between about 50 μm and about 600 μm.

Referring again to FIGS. 5, 5A and 5B, the monolithic body 350 employed in the fiber assembly 300 has the same composition and structure as the monolithic body 50 employed in the electrically conductive articles 100, 100a and 100b outlined in the foregoing. Similarly, the electrically conducting element 320 and one or more discrete layers 330 of metallic sliver employed in the fiber assembly 300 shares the same characteristics and processing as the electrically conducting element 20 and discrete layer or layers 30 employed in the foregoing articles 100, 100a and 100b. Accordingly, the discrete layers 330 of the conducting element 320 of the fiber assembly 300 are governed by a thickness 332, spacing 324 to the first surface 362 and spacing 322 between adjacent layers 330, all of which are comparable in structure and processing to the respective thickness 32 and spacings 22 and 24 described in connection with the foregoing discrete layers 30 employed in the articles 100, 100a and 100b. In addition, some implementations of the fiber assembly 300 employ a layer of compressive stress having a depth of layer (not shown in FIGS. 5, 5A and 5B) comparable in structure and processing to the respective layer of compressive stress 60 and depth of layer 64 of the electrically conductive articles 100, 100a and 100b described in the foregoing.

According to an implementation of an electrically conductive article configured as a fiber assembly 300, a monolithic body 350 was formed from a cane of Corning® 2320 glass, drawn to a final diameter of about 150 μm. The body 350 was then subjected to an ion exchange process according to the foregoing methods. In particle, the body 350 was immersed in a salt bath consisting of 5% AgNO$_3$ and 95% NaNO$_3$ (by weight) at 350° C. for about 0.5 hours to incorporate silver ions into the body 350 of the fiber. The monolithic body 350 was then subjected to a reduction process with flowing hydrogen gas introduced over the fiber at 400° C. for about 2 hours. The resulting fiber assembly 300 possessed an electrically conducting element 320 having one or two layers 330 of discrete metallic silver, embedded in the fiber beneath the outer surface of the monolithic body 350. These variants (i.e., a fiber assembly 300 with one or two respective discrete layers 330 of metallic silver) are reflected in the cross-sections of the fiber 300 depicted in FIGS. 5A and 5B.

Figure 6:
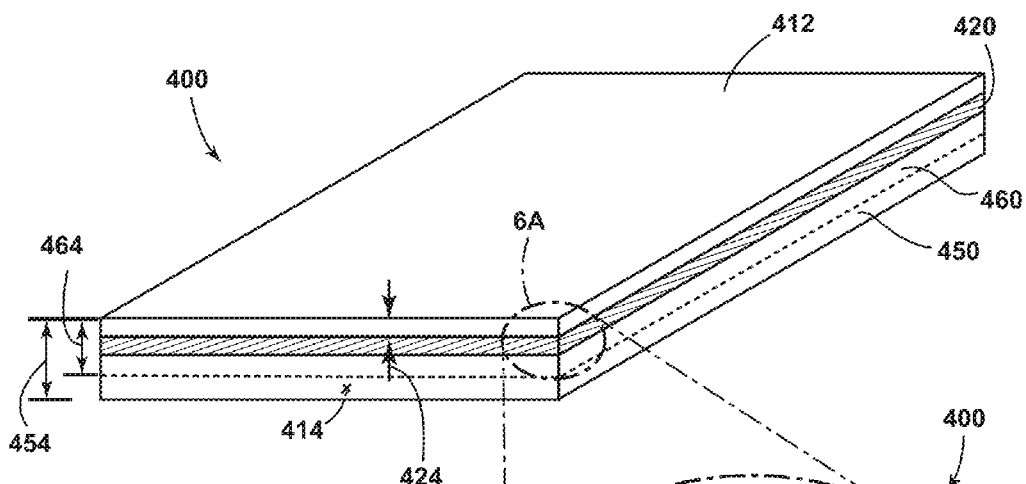
FIG. 6 schematically depicts a perspective view of an electrically conductive article having a monolithic glass body configured as a flexible glass substrate according to an embodiment of the disclosure.
Figure 6A:
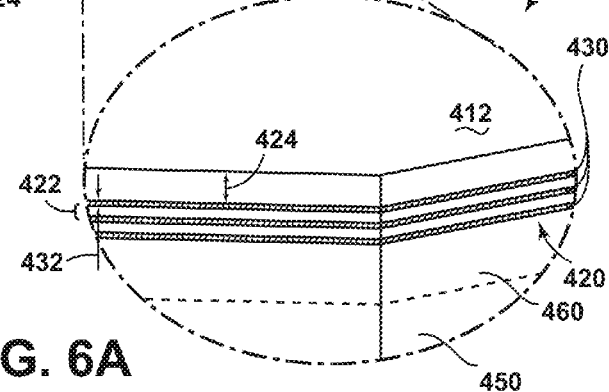
FIG. 6A is an enlarged perspective view of the electrically conductive article depicted in FIG. 6 having a plurality of discrete layers of metallic silver.
Figure 6B:
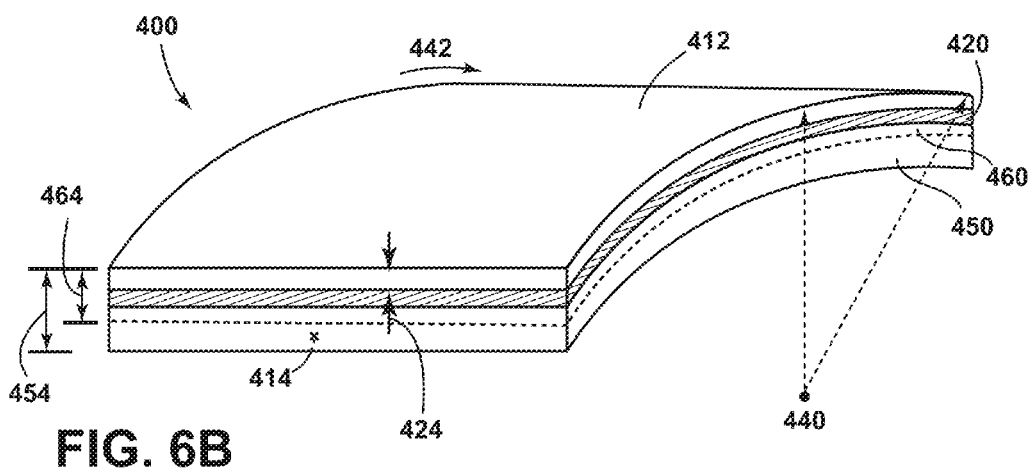
FIG. 6B is a perspective view of the electrically conductive article schematically depicted in FIG. 6, as flexed to a particular bend radius.

Now referring to FIGS. 6, 6A and 6B, a further aspect of the disclosure relates to electrically conductive articles 400 that are configured to include a flexible glass substrate. In particular, the electrically conductive article 400 includes an electrically conducting element 420 and a monolithic glass body 450. The electrically conductive article 400 has features that are comparable to the electrically conductive articles 100, 100a and 100b outlined in the foregoing. In particular, the electrically conductive article 400 generally comprises a first surface 412, a second surface 414 and a monolithic body 450 which extends from the first surface 412 to the second surface 414. The monolithic body 450 and the electrically conductive article 400 are further defined by a thickness 454. In addition, the monolithic body 450 is continuous with the first surface 412 and the second surface 414 such as when the body is formed from a single piece of glass.

The monolithic glass body 450 of the electrically conductive article 400 may have a variety of different forms. For example, in some embodiments, the first surface 412 and the second surface 414 may be parallel with one another such as when the article 400 is employed as a flexible display substrate (e.g., for a mobile phone application). In most implementations of the electrically conductive articles 400 containing a flexible monolithic glass body 450 (e.g., a flexible glass substrate) depicted in FIGS. 6, 6A and 6B, the body 450 is in the form of a substrate having a thickness 454 ranging from 25 μm to about 250 μm in thickness.

Referring again to FIGS. 6, 6A and 6B, the monolithic body 450 employed in the electrically conductive assembly 400 has the same composition and structure as the monolithic body 50 employed in the electrically conductive articles 100, 100a and 100b outlined in the foregoing. Similarly, the electrically conducting element 420 and one or more discrete layers 430 of metallic sliver employed in the assembly 400 share the same characteristics and processing as the electrically conducting element 20 and discrete layer or layers 30 employed in the foregoing articles 100, 100a and 100b. Accordingly, the discrete layers 430 of the conducting element 420 of the assembly 400 are governed by a thickness 432, spacing 424 to the first surface 412 and spacing 422 between adjacent layers 430, all of which are comparable in structure and processing to the respective thickness 32 and spacings 22 and 24 described in connection with the foregoing discrete layers 30 employed in the articles 100, 100a and 100b. In addition, some implementations of the assembly 400 employ a layer of compressive stress 460 having a depth of layer 464 comparable in structure and processing to the respective layer of compressive stress 60 and depth of layer 64 of the electrically conductive articles 100, 100a and 100b described in the foregoing.

As shown in FIG. 6B, the electrically conductive assembly 400 can be flexed to a bend radius 440 without breakage. Various considerations outside the essential scope of this disclosure can be employed to improve or otherwise influence the resistance of the assembly 400 and, in particular, its flexible monolithic glass body 450 to breakage associated with static and cyclic bend stresses. Such factors, including certain processing conditions associated with the development of a layer of compressive stress 460 with a particular depth of layer 464 and compressive stress ranges can be found in U.S. patent application Ser. No. 14/601,698, filed Jan. 21, 2015, hereby incorporated by reference. It should also be noted that the processes and design considerations applicable to the conductive elements and one or more discrete layers of metallic silver of the earlier embodiments in the disclosure are also applicable to the conductive element 420 and its one or more discrete layers 430 of metallic silver.

Based on the foregoing, it should now be understood that the electrically conductive articles described herein and comprising one or more discrete layers of metallic silver within a monolithic glass body may be utilized in various applications requiring a glass body having an electrically conductive element. The discrete layer(s) of metallic silver which impart the electrical characteristics to the article are contained within the monolithic glass body of the glass article. As such, the electrically conductive articles described herein are more robust and damage tolerant compared to conventional configurations of glass substrates or the like having surface-mounted conductors, which may be easily damaged and/or removed.

Moreover, it should also be understood that the electrical properties of the articles described herein may be altered by controlling the processing conditions related to the formation of the one or more discrete layers of metallic silver embedded within the monolithic glass body. For example, the composition and temperature of a bath employed to introduce silver ions into the monolithic glass body can be varied to impart different concentrations of silver ions within the monolithic body. In turn, these differing silver ion concentration levels can result in various structures associated with the discrete layers of metallic silver that develop in the article upon exposure to a subsequent hydrogen reduction step according to the disclosure.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An electrically conductive article, comprising:
    a monolithic glass body having a first primary surface; and
    an electrically conducting element formed in the body, the element comprising a discrete layer, or a plurality of discrete layers, of metallic silver,
    wherein each layer has a thickness T such that $0.1\ \mu m \leq T \leq 0.5\ \mu m$ and an electrical resistivity ($\rho$) of about 50 n$\Omega \cdot$m to about 2000 n$\Omega \cdot$m, and
    further wherein the element is spaced apart from the first primary surface by a distance D, wherein $0.1\ \mu m \leq D \leq 20\ \mu m$ article, and
    wherein the monolithic glass body is configured as a fiber having a diameter between about 50 μm and about 600 μm.

2. The article of claim 1, further comprising:
    a layer of compressive stress extending into the body having a depth of layer DOL of up to about 60 μm and magnitude of compression CS$\geq$200 MPa.

3. The article of claim 1, wherein each layer has a thickness T such that $0.1\ \mu m \leq T \leq 0.5\ \mu m$ and an electrical resistivity of about 100 n$\Omega \cdot$m to about 500 n$\Omega \cdot$m.

4. The article of claim 1, wherein the conducting element comprises a plurality of discrete layers of metallic silver, each layer spaced apart from an adjacent discrete layer of metallic silver by a spacing S such that S$\leq$500 nm.

5. The article of claim 1, wherein the diameter is about 150 μm.

6. An electrically conductive article configured as a fiber, comprising:
    a first surface;
    a fiber core having a central axis;
    a glass body that extends from the first surface to the central axis, wherein the glass body has a diameter of between about 50 μm and about 600 μm; and
    one or more discrete layers of metallic silver embedded in the glass body beneath the first surface configured to provide an electrical connection along the fiber.

7. The article of claim 6, wherein the diameter is about 150 μm.

8. The article of claim 6, wherein the fiber is an optical fiber.

* * * * *

UNITED STATES PATENT AND TRADEMARK OFFICE
CERTIFICATE OF CORRECTION

| | | |
|---|---|---|
| PATENT NO. | : 10,116,035 B2 | Page 1 of 1 |
| APPLICATION NO. | : 15/139550 | |
| DATED | : October 30, 2018 | |
| INVENTOR(S) | : Nicholas Francis Borrelli et al. | |

It is certified that error appears in the above-identified patent and that said Letters Patent is hereby corrected as shown below:

On the Title Page

On page 2, item (56), U.S. Patent Documents, Line 9, delete "Kasper et al." and insert -- Kaspar et al. --, therefor.

Signed and Sealed this
Twelfth Day of May, 2020

Andrei Iancu
*Director of the United States Patent and Trademark Office*